US008015354B2

(12) United States Patent
Tsuji

(10) Patent No.: US 8,015,354 B2
(45) Date of Patent: Sep. 6, 2011

(54) INFORMATION PROCESSOR, VIRTUAL DISK MANAGING METHOD, AND COMPUTER-READABLE RECORDING MEDIUM THAT RECORDS DEVICE DRIVER

(75) Inventor: Syuntaro Tsuji, Osaka (JP)

(73) Assignee: KYOCERA MITA Corporation, Osaka (JP)

( * ) Notice: Subject to any disclaimer, the term of this patent is extended or adjusted under 35 U.S.C. 154(b) by 568 days.

(21) Appl. No.: 12/236,828

(22) Filed: Sep. 24, 2008

(65) Prior Publication Data
US 2009/0106493 A1   Apr. 23, 2009

(30) Foreign Application Priority Data

Oct. 22, 2007  (JP) ................................ 2007-274172

(51) Int. Cl.
*G06F 12/00* (2006.01)
(52) U.S. Cl. ......... 711/114; 711/154; 711/156; 711/170
(58) Field of Classification Search .................. 711/114, 711/154, 156, 170
See application file for complete search history.

(56) References Cited

U.S. PATENT DOCUMENTS

| | | | |
|---|---|---|---|
| 5,542,065 A * | 7/1996 | Burkes et al. ................. | 711/114 |
| 6,571,309 B2 * | 5/2003 | Ando et al. ..................... | 711/4 |
| 2002/0026558 A1 * | 2/2002 | Reuter et al. .................. | 711/114 |
| 2002/0188802 A1 | 12/2002 | Yagisawa et al. | |
| 2005/0102480 A1 | 5/2005 | Yagisawa et al. | |
| 2010/0030960 A1 * | 2/2010 | Kamalavannan et al. ... | 711/114 |

OTHER PUBLICATIONS http://www.intel.com/support/chipsets/imsm/sb/cs-020681.htm (Jun. 4 2008).

* cited by examiner

*Primary Examiner* — John Lane
(74) *Attorney, Agent, or Firm* — Frommer Lawrence & Haug LLP

(57) ABSTRACT

The present invention claims and discloses an information processor comprising: an auxiliary storing unit that has at least one and preferably two auxiliary storage devices in which at least three distributable virtual disks are formed so as to be distributed; a disk array control unit that controls the at least three distributable virtual disks that designate one of disk control modes; a CB storing unit that stores a control block in each virtual disk that includes but is not limited to first designation information for designating the disk control mode and second designation information for designating an auxiliary storage; and a device driver unit that generates control information of the disk array control unit including but not limited to the first designation information and the second designation information and that transmits the control information to the disk array control unit based on a request for accessing any of the at least three distributable virtual disks and a control block corresponding to the requested virtual disk.

16 Claims, 15 Drawing Sheets

```
#include<linux/kerne.h>
                              35
diskaccess(){ . . .
}
ioctl(){ . . .
}                  36
init(){ . . .

struct disktalbe{                                          ⎫
     unsigned char diskno;    /*Minor number*/             ⎪
     unsigned char raidtype;  /*Disk control mode*/        ⎪
     unsigned char hddch;     /*Physical disk used*/       ⎬ Structure declaration part 5000
     unsigned long sectors;   /*Total number of sectors*/  ⎪
     unsigned long lbaoff[2]; /*LBA offset*/               ⎪
     }                                                     ⎭
```

FIG. 3

| | | |
|---|---|---|
| Minor number 50 | 1 | ⎫ |
| Disk control mode 51 | RAID0 | ⎪ |
| Physical disk used 52 | Ch0&Ch1 | ⎬ First virtual disk CB 41 |
| Total number of sectors 53 | 0x3000 | ⎪ |
| LBA offset 54 | 0x2000 | ⎪ |
| | ⋮ | ⎭ |
| Minor number 50 | 2 | ⎫ |
| Disk control mode 51 | RAID1 | ⎪ |
| Physical disk used 52 | Ch0&Ch1 | ⎬ Second virtual disk CB 42 |
| Total number of sectors 53 | 0x4000 | ⎪ |
| LBA offset 54 | 0x8000 | ⎪ |
| | ⋮ | ⎭ |
| Minor number 50 | 3 | ⎫ |
| Disk control mode 51 | Single | ⎪ |
| Physical disk used 52 | Ch1 | ⎬ Third virtual disk CB 43 |
| Total number of sectors 53 | 0x3000 | ⎪ |
| LBA offset 54 | 0x5000 | ⎪ |
| | ⋮ | ⎭ |
| Minor number 50 | 4 | ⎫ |
| Disk control mode 51 | Single | ⎪ |
| Physical disk used 52 | CH0 | ⎬ Fourth virtual disk CB 44 |
| Total number of sectors 53 | 0x4000 | ⎪ |
| LBA offset 54 | 0x2000 | ⎪ |
| | ⋮ | ⎭ |

FIG. 6

Format 200a of disk access request for RAID driver 32

Write request 200b

Read request 200c

Write request 200d

Read request 200e

Write request 200f

US 8,015,354 B2

INFORMATION PROCESSOR, VIRTUAL DISK MANAGING METHOD, AND COMPUTER-READABLE RECORDING MEDIUM THAT RECORDS DEVICE DRIVER

INCORPORATION BY REFERENCE

This application is based upon and claims the benefit of priority from the corresponding Japanese Patent Application No. 2007-274172, filed Oct. 22, 2007, the entire contents of which is incorporated herein by reference.

FIELD OF THE INVENTION

The present invention teaches and claims an information processor to which a storage device having a disk array configuration called RAID (Redundant Arrays of Inexpensive/Independent Disks) for improving reliability and performance of an auxiliary storage is connected and to a device driver provided for the same.

BACKGROUND OF THE INVENTION

In recent years, information processors such as a server computer and a personal computer use a disk array technique to virtually handle a plurality of auxiliary storages as a single storage in order to improve disk access speed and to protect stored data. Various methods have been devised for the disk array technique. Representative methods are RAID0 and RAID1.

RAID0 is also called striping. It is a method of dispersing data on a block unit basis to a plurality of auxiliary storage devices, thereby improving disk access speed. For RAID0, at least two auxiliary storages are necessary. On the other hand, RAID1, called mirroring, is a method of writing the same data simultaneously to a plurality of auxiliary storage devices to protect stored data. For RAID1, at least two auxiliary storage devices are necessary in a manner similar to the above. Hereinafter, the function of the RAID0 will be called the RAID0 mode, and the function of the RAID1 will be called the RAID1 mode.

In some cases, depending on the data handled, data is sorted into data emphasized with access speed and data emphasized with protection.

To realize this, there is an information processor that switches between the RAID0 mode and the RAID1 mode using at least four auxiliary storage devices; two auxiliary storage devices dedicated to the RAID0 mode, and two auxiliary storage devices dedicated to the RAID1 mode.

Another technique called matrix RAID is also disclosed. In the matrix RAID, two auxiliary storage devices can be switched between the RAID0 mode and the RAID1 mode depending on data handled. A storage area constructed in the RAID0 mode and a storage area constructed in the RAID1 mode are mixedly exist.

SUMMARY OF THE INVENTION

An information processor according to one embodiment of the present invention comprises: a main storing unit; an auxiliary storing unit that has at least one, preferably two, auxiliary storage devices in which at least three distributable virtual disks are formed so as to be distributed; a disk array control unit that connects to the auxiliary storing unit and controls the at least three distributable virtual disks with one of the designated disk control modes including a RAID0 mode, a RAID1 mode, and a single mode; a CB (control block) storing unit that stores a CB in each virtual disk that includes first designation information for designating the disk control mode and second designation information for designating an auxiliary storage device used in the designated disk control mode; and a device driver unit that generates, on the main string unit, control information of the disk array control unit including the first designation information and the second designation information and that directly or indirectly transmits the control information to the disk array control unit based on a request for accessing any of the at least three distributable virtual disks and a control block corresponding to the requested virtual disk.

The above and other objects, features, aspects and advantages of the present invention will become more apparent from the following detailed description of the present invention when taken in conjunction with the accompanying drawings.

In this text, the terms "comprising", "comprise", "comprises" and other forms of "comprise" can have the meaning ascribed to these terms in U.S. Patent Law and can mean "including", "include", "includes" and other forms of "include".

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which exemplary embodiments of the invention are illustrated in the accompanying drawings in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings, in which:

FIG. 3 shows a diagram showing a part of a source file of a RAID driver according to still another embodiment of the present invention.

FIG. 6 shows a diagram showing a memory map of a DRAM in a case where control blocks are stored.

DESCRIPTION OF THE PREFERRED EMBODIMENTS

Reference will now be made in detail to various embodiments of the present invention, one or more examples of which are illustrated in the accompanying drawings. Each example is provided by way of explanation of the present invention, and by no way limiting the present invention. In fact, it will be apparent to those skilled in the art that various modifications, combination, additions, deletions and variations can be made in the present invention without departing from the scope or spirit of the present invention. For instance, features illustrated or described as part of one embodiment can be used in another embodiment to yield a still further embodiment. It is intended that the present invention covers such modifications, combinations, additions, deletions, applications and variations come within the scope of the appended claims and their equivalents.

Hereinafter, description will be made of various embodiments of the present invention with reference to the accompanying drawings.

1. Hardware Configuration

Generally, a RAID technique is applied to a network server for improvement in high-speed processing and fault tolerance. In recent years, image forming apparatuses (particularly, a complex machine) have large-capacity HDD (Hard Disk Drive), or are connected to a network. In some cases, high-speed processing and fault tolerance need to be improved. In one embodiment of the present invention, in view of the foregoing point, a case of applying the RAID technique to an image forming apparatus will be described.

Figure 2:
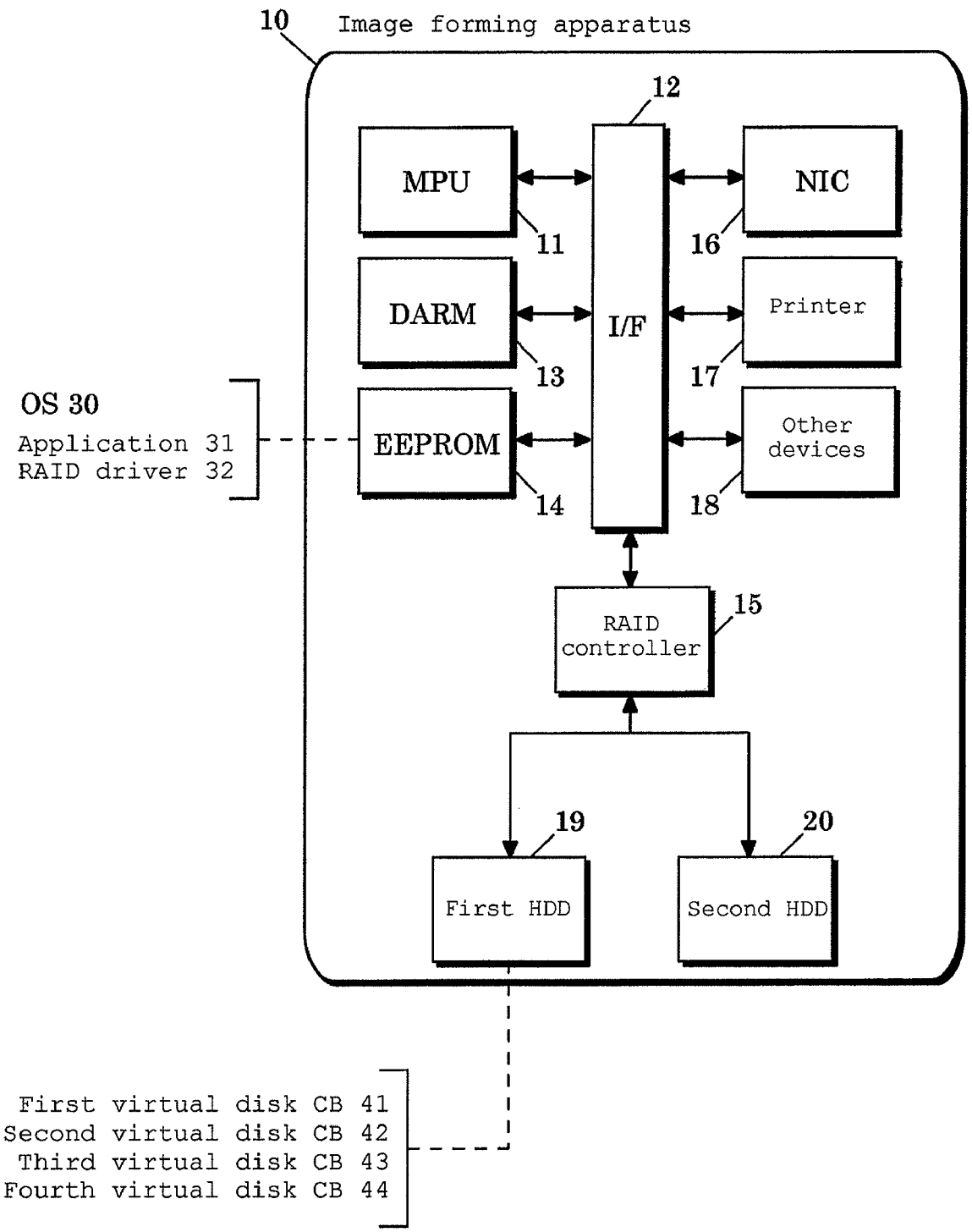
FIG. 2 shows a schematic block diagram showing a hardware configuration of the image forming apparatus according to another embodiment of the present invention.

FIG. 2 is a schematic block diagram showing a hardware configuration of the image forming apparatus according to one embodiment of the present invention.

An image forming apparatus 10 has an MPU (Micro Processing Unit) 11, an interface 12, a DRAM (Dynamic Random Access Memory) 13, an EEPROM (Erasable Programmable Read Only Memory) 14, a RAID controller 15, an NIC (Network Interface Card) 16, a printer 17, other devices 18, a first HDD 19, and a second HDD 20. The image forming apparatus 10 is, concretely, a printer, a copier, a scanner, a facsimile, or an MFP (Multifunction Peripheral).

The MPU 11, the DRAM 13, the EEPROM 14, the RAID controller 15, the NIC 16, the printer 17, and the other devices 18 are connected to each other via the interface 12. In FIG. 2, a plurality of interfaces is shown by a single block for simplicity.

The DRAM 13 (main string unit) is used as a work area. The EEPROM 14 could, for example, be a flash memory. In the EEPROM 14, an OS 30 including the Linux® kernel, a plurality of applications 31 operating on the OS 30, and a RAID driver 32 according to the present invention are stored.

The MPU 11 executes a process defined by software, such as the OS 30 and the application 31, and controls the general operation of the image forming apparatus 10.

The MPU 11 operates as a device driver unit for executing a process defined by a RAID driver 32 (device driver). That is, the RAID driver 32 executes a process of operating a virtual disk of the present embodiment in cooperation with the MPU 11. In one exemplary embodiment, in order to avoid complicated explanation, the process cooperatively executed by the RAID driver 32 and the MPU 11 (device driver unit) will be described based on an assumption that the process is executed by the RAID driver 32.

FIG. 3 is a diagram showing a part of a source file of the RAID driver 32. In the source file, a disk access function 35, an initialization function 36, and the like which will be described later are included. The functions conform with, for example, the ANSI-C standard.

The RAID driver 32 stored in the EEPROM 14 is compiled from the source file to a loadable module form. The RAID driver 32 is assembled in the kernel by a method described later in the section entitled "Process of Registering Data to Virtual Disk According to the Present Invention". According to a disk access request from an upper layer, the RAID controller 15 is controlled.

To the RAID driver 32, a major number is assigned so that the driver can be specified from the OS 30 side. In the present embodiment according to the present invention, as the major number, "300" is assigned.

The RAID controller 15 is connected to the interface 12, the first HDD 19, and the second HDD 20. The RAID controller 15 has the following disk control modes: a RAID0 mode, a RAID1 mode, and a single mode. The RAID controller 15 controls the first HDD 19 and/or the second HDD 20 accordance with a disk access request from the RAID driver 32 in any of the disk control modes. That is, the RAID controller 15 operates as a disk array control unit.

The first HDD 19 and the second HDD 20 are auxiliary storage devices for storing data and are, concretely, magnetic disk drives according to a standard such as IDE, SCSI, USB, or the like. By applying the RAID technique, the first HDD 19 and the second HDD 20 serve as auxiliary storing units that operate in cooperation with each other. For convenience, exemplary embodiments of the present invention will be described by using auxiliary storing units of the same type and having the same capacity. However, in application of the RAID technique of the present invention, auxiliary storing units of different types and having different capacities may also be used.

Figure 4:
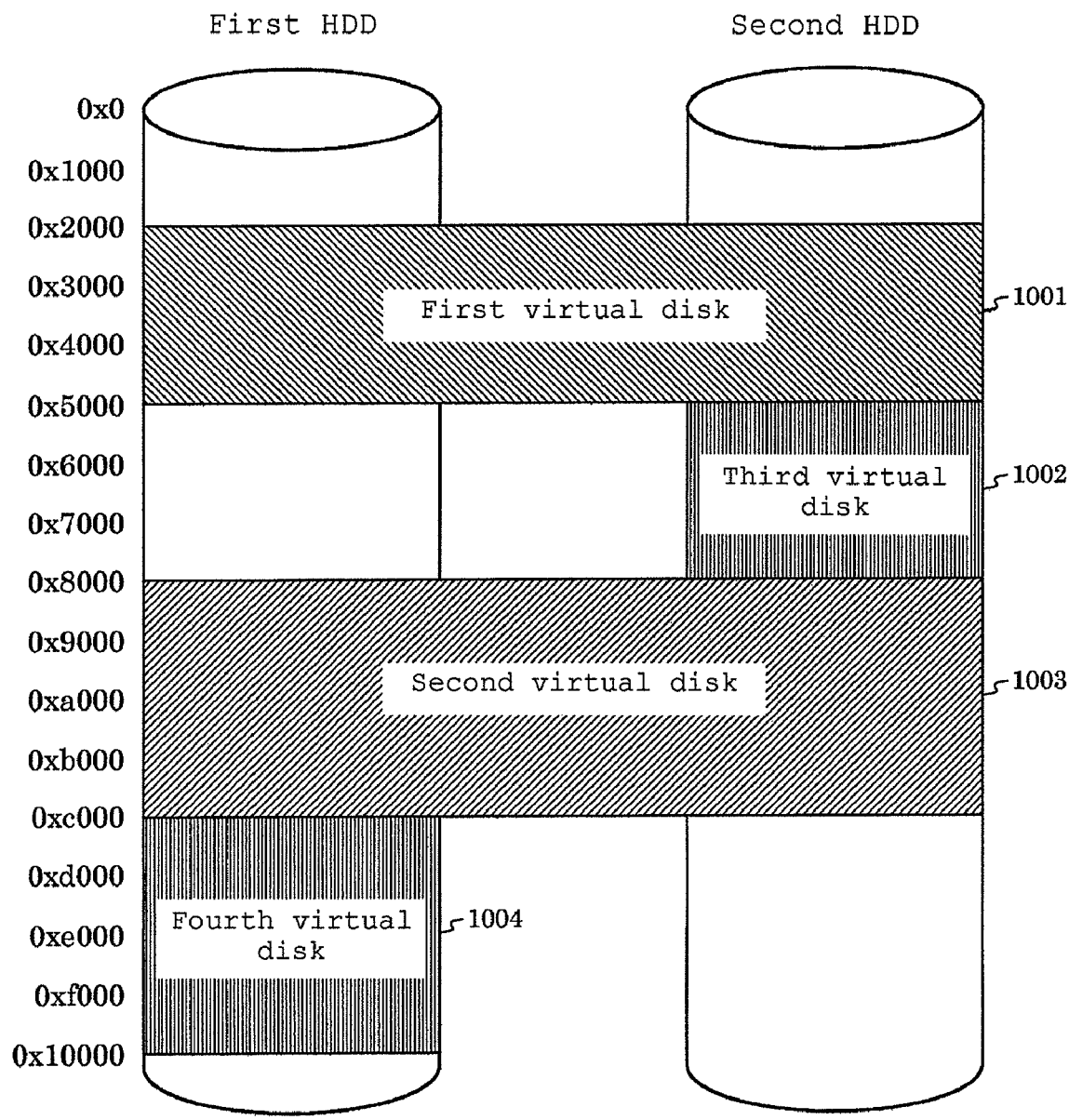
FIG. 4 shows a diagram showing a corresponding relationship between storage areas in a first HDD and/or a second HDD and a plurality of virtual disks.

The first HDD 19 and the second HDD 20 are recognized as two physical disks from the perspective of the RAID controller 15 and the RAID driver 32. However, they are not recognized as physical disks by the OS 30 and the application 31 in layers upper than the RAID driver 32. From the OS 30 and the application 31, areas 1001, 1002, 1003, and 1004 in the first and second HDDs, as shown in FIG. 4 are recognized as physical disks, that is, virtual disks. Hereinafter, the areas will be called as a first virtual disk 1001, a second virtual disk 1002, a third virtual disk 1003, and a fourth virtual disk 1004. Numerical values on the vertical axis in FIG. 4 show sector addresses in the LBA (Logical Block Addressing) method.

The RAID controller 15 and the RAID driver 32 handle the area assigned to the first virtual disk 1001 as an area dedicated to the RAID0 mode, handle the area assigned to the second virtual disk 1002 as an area dedicated to the RAID1 mode, and handle the area assigned to the third virtual disk 1003 and handle the fourth virtual disk 1004 as an area dedicated to a single mode. Although a blank area in each of the disks in FIG. 4 is not used in the present embodiment, the area may be assigned as a virtual disk dedicated to the single mode.

Figure 5A:
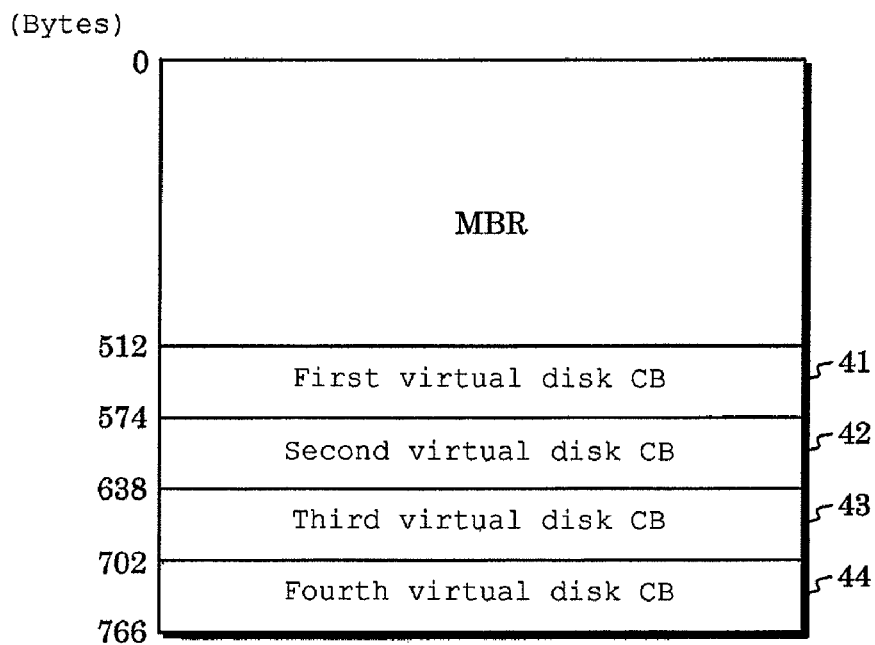
FIG. 5A shows a diagram showing a part of data recorded on the first HDD.

FIG. 5A is a diagram showing a part of data recorded in the first HDD 19. In the first HDD 19, immediately after MBR (Master Boot Record) at the head sector, there are four disk control blocks (disk CBs) which are recorded in order: a first virtual disk CB 41, a second virtual disk CB 42, a third virtual disk CB 43, and a fourth virtual disk CB. That is, the first HDD 19 serves as the auxiliary storage device and also as a CB (Control Block) storing unit. The first virtual disk CB 41, the second virtual disk CB 42, the third virtual disk CB 43, and the fourth virtual disk CB 44 are data assemblies necessary for forming the first virtual disk 1001, the second virtual disk 1002, the third virtual disk 1003, and the fourth virtual disk 1004, respectively.

Figure 5B:
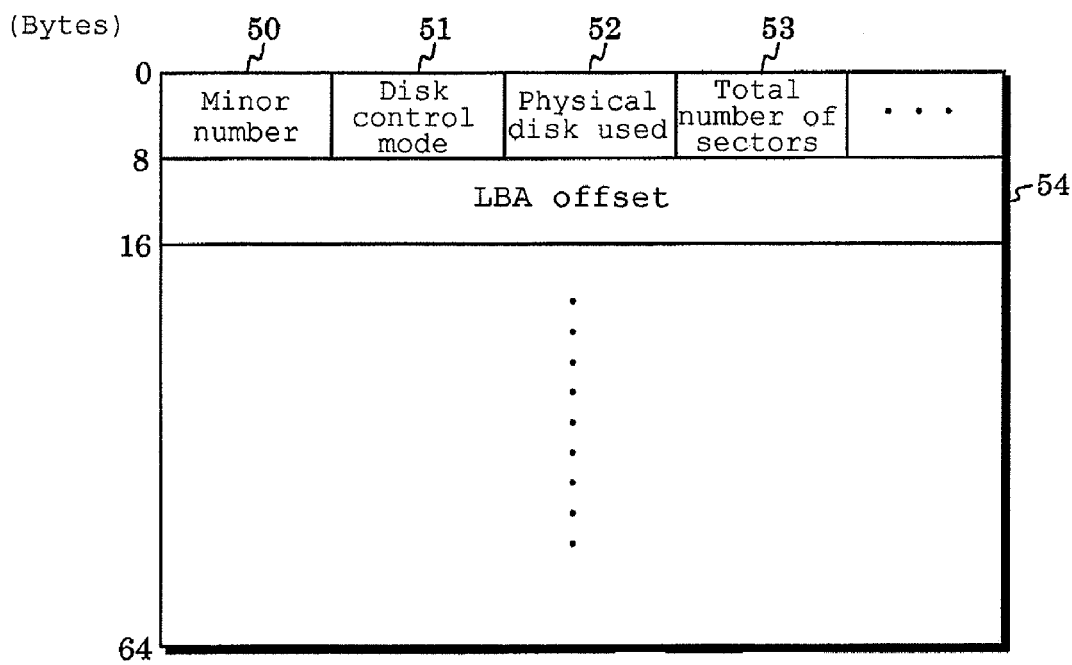
FIG. 5B is a diagram showing a data structure in a first virtual disk control block.

FIG. 5B is a diagram showing a data structure in the first virtual disk control block 41. The other control blocks 42 to 44 have the same data structure. The vertical axis is expressed in relative notation.

The data structure in the first virtual disk control block 41 includes minor number information 50, disk control mode information 51, information 52 of a physical disk used, total sector number information 53, and LBA offset information 54. When the RAID driver 32 is assembled in the kernel, the information in the first HDD 19 is stored in predetermined areas in the DRAM 13 as shown in FIG. 6. The RAID driver 32 can use this information as needed. The details of the storage will be described later in the section entitled "Process of Registering Data to Virtual Disk According to the Present Invention". In the present embodiment, the first virtual disk control block 41 includes information necessary for forming a normal virtual disk, that is, the minor number information 50, the information 53 of total number of sectors, and the LBA offset information 54 and, in addition, the disk control mode information 51 and the information 52 of a physical disk used.

The minor number information 50 is virtual disk identification information (second disk identification information). Numbers 1 to 4 in the minor numbers 50 correspond to the first to fourth virtual disks, respectively.

The disk control mode information 51 is information for designating any of the RAID0 mode, the RAID1 mode, or the single mode which can be controlled by the RAID controller 15.

The physical disk used information 52 is information used to designate the auxiliary storage devices (the first HDD 19 and/or the second HDD 20) as a physical disk(s) that are actually used (accessed) in the disk control mode in correspondence with the virtual disk. In the current embodiment of the present invention, channel numbers are used as the information for designating. The channel number of the first HDD 19 is "Ch1", and the channel number of the second HDD 20 is "Ch2". In the current embodiment of the present invention, the first and second virtual disks 1001 and 1002 use both Ch1 and Ch2. The third virtual disk uses Ch2, and the fourth virtual disk uses Ch1.

The total sector number information 53 is information indicative of the total number of sectors of the virtual disk.

The LBA offset information 54 is information indicative of the difference between an LBA address of a virtual disk and an LBA address in a physical disk. The value itself indicates the head address of the virtual disk.

Referring again to FIG. 2, the NIC 16 connected to a host computer on a network, accepts a disk access request to the first disk 1001, the second disk 1002, the third disk 1003, or the fourth disk 1004 from the computer, and then passes it to the kernel.

The printer 17 has a print engine, a paper feeder, a conveyer, and a paper ejector. The printer 17 forms an electrostatic latent image on a photosensitive drum of the print engine based on supplied bit map data, develops the electrostatic latent image with toner, transfers it onto a sheet, fixes it, and ejects the sheet.

The other devices 18 include, for example, a scanner, a facsimile, and an operation panel.

2. Configuration of Main Components

Figure 1:
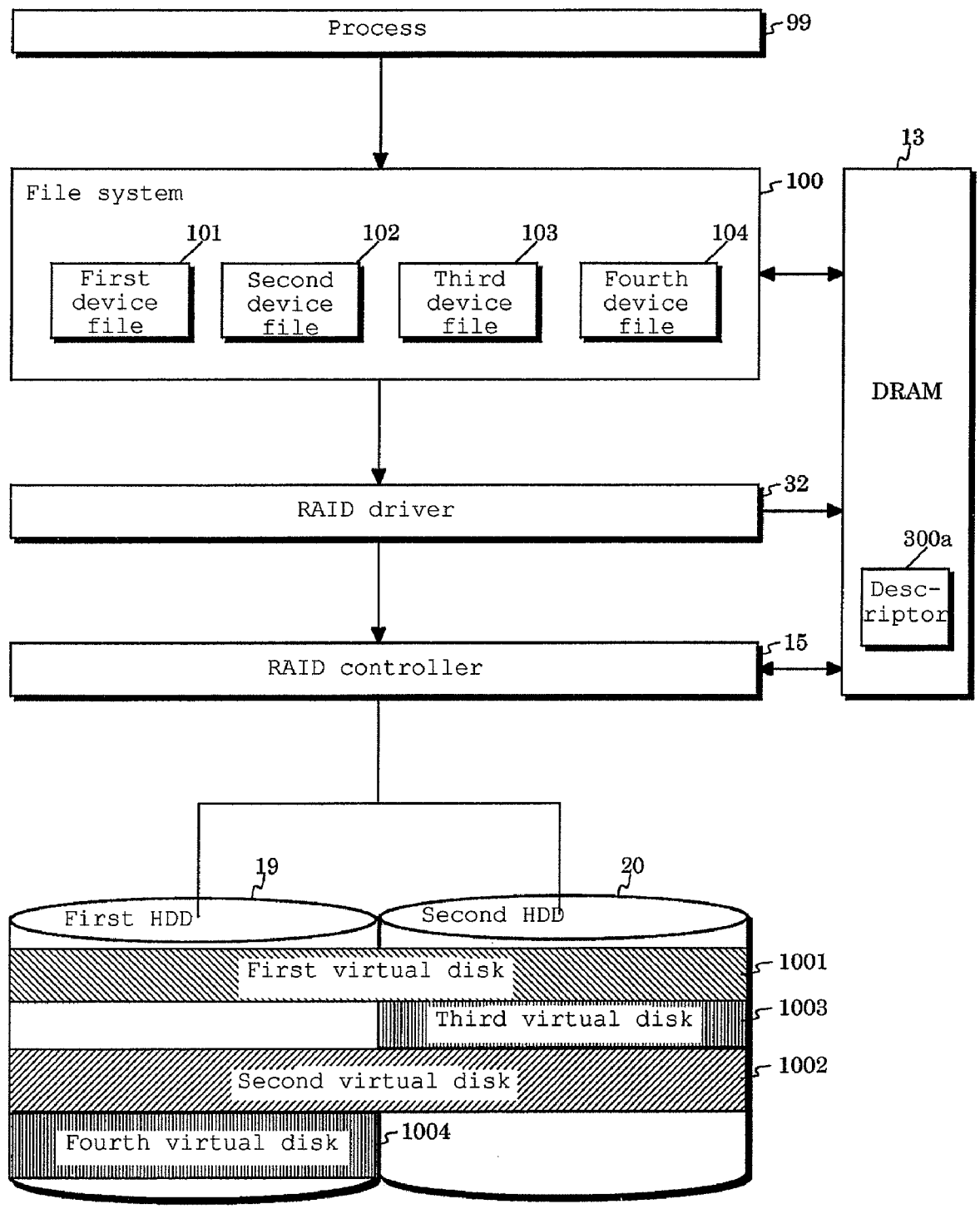
FIG. 1 shows a functional block diagram showing a configuration of a main part of an image forming apparatus according to one embodiment of the present invention.

FIG. 1 is a functional block diagram showing a configuration of main components of an image forming apparatus 10 according to one embodiment of the present invention.

To realize the present invention, the image forming apparatus 10 mainly includes a process 99, a file system unit 100, the DRAM 13, the RAID driver 32, the RAID controller 15, the first HDD 19, and the second HDD 20.

The process is a procedure of the application 31 or a procedure from a request accepted from a computer on a network via the NIC 16 that is executed by the MPU 11.

In response to a disk access request from the process 99, the file system unit 100 issues a disk access request for controlling the RAID driver 32 (which will be described later) to the RAID driver 32. The file system unit 100 includes, as data, a first device file 101, a second device file 102, a third device file 103, and a fourth device file 104, are all registered in the kernel.

The first, second, third, and fourth device files 101, 102, 103, and 104 correspond to the first, second, third, and fourth virtual disks 1001, 1002, 1003, and 1004, respectively. The first to fourth device files are referred to by the file system unit 100 to access the first to fourth virtual disks 1001 to 1004. When the MPU 11 makes the disk access request in accordance with the process 99, the request is sent using any of the device files 101 to 104 as an argument to the file system unit 100. The file system unit 100 starts the RAID driver 32 assembled in the kernel with reference to the device file 101, 102, 103, or 104 designated by the argument, and an access to the virtual disk(s) on the HDD 19 or/and the HDD 20 is realized.

In the device files 101 to 104, the major number is used to specify the RAID driver 32 in a lower layer, and the minor number 50 is used to specify the virtual disk in a lower layer. Concretely, the major number "300" of the RAID driver 32 is registered in the first through fourth device files 101 to 104 so that the files can call the same RAID driver 32. The minor number "1" is registered in the first device file 101. The minor number "2" is registered in the second device file 102. The minor number "3" is registered in the third device file 103. The minor number "4" is registered in the fourth device file 104.

As described above, the RAID driver 32 controls the RAID controller 15 in accordance with a disk access request from the file system unit 100. Specifically, the RAID driver 32 generates a descriptor 300a on the DRAM 13. The descriptor 300a is based on the disk access request and any one of the first through fourth virtual disk control blocks 41 to 44 (refer to FIG. 6) according to the request. The RAID driver 32 transmits head address information (memory buffer address information which will be described later) of the descriptor 300a on the DRAM 13 together with a disk access start instruction to the RAID controller 15. In the following, the disk access request from the file system unit 100 and the descriptor 300a generated by the RAID driver 32 will be described in order.

Figure 7A:
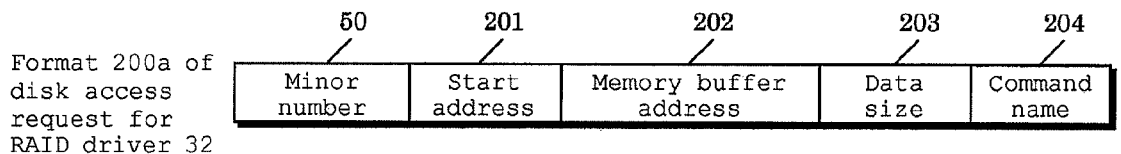
FIGS. 7A to 7F are explanatory diagrams of a plurality of types of disk access requests received by a RAID driver.

FIG. 7A is a diagram showing the format of a disk access request received by the RAID driver 32. A disk access request 200a includes the minor number information 50, start address information 201, memory buffer address information 202, data size information 203, and command name information 204.

The minor number information 50 varies among virtual disks to which disk access requests are related. As the minor number information 50, minor numbers registered in the device files 101 to 104 corresponding to virtual disks to be accessed are set.

The start address information 201 indicates a sector address in the first or second HDD, which is the reference in determining the head address at the time of starting an access to a virtual disk. The sector address is expressed by a numerical value in hexadecimal (0x). Similarly, all of the following addresses and numerical values are expressed in hexadecimal.

The memory buffer address information 202 indicates the head address on the DRAM 13 to which data to be accessed is temporarily stored.

The data size information 203 indicates the size (the number of bytes) of data to be accessed.

In the command name information 204, the name of a command corresponding to a process indicating that the disk access request which is either a data read request or a data write request, is set.

Figure 8A:
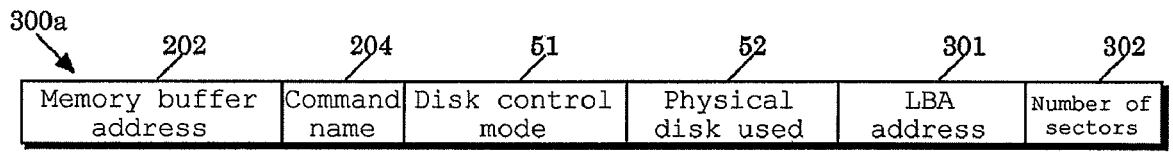
FIGS. 8A to 8F are explanatory diagrams of a plurality of types of descriptors generated by the RAID driver.

FIG. 8A is a diagram showing the format of the descriptor 300a generated by the RAID driver 32. The descriptor 300a includes the memory buffer address information 202, the command name information 204, the disk control mode information 51, the physical disk used, LBA address information 301, and the sector number.

The memory buffer address information 202 and the command name information 204 in the descriptor 300a is extracted from the disk access request 200a (refer to FIG. 7A). The disk control mode information 51 and the physical disk used information 52 is taken from any of the control blocks 41 to 44 (refer to FIG. 6) corresponding to the disk access request 200a.

The LBA address information 301 is based on the start address information 201 included in the disk access request 200a and the LBA offset information 54 included in any of the control blocks 41 to 44 specified by the minor number information 50 in the disk access request 200a. The LBA address information is determined as follows:

LBA address=start address+LBA offset

The LBA address information 301 indicates the head address of a virtual disk from/to which data is read/written in accordance with the command name information 204.

The sector number information 302 is information indicative of the number of sectors subject to a disk access. The sector number information 302 is determined as follows based on the data size information 203 included in the disk access request 200a and the data size per sector according to the disk control mode information 51:

The number of sectors=data size/data size per sector

The disk control mode 51 is indicative of the designated mode corresponding to any of the control blocks 41 to 44 specified by the minor number information 50 in the disk access request 200a.

In the present embodiment, the data size per sector is 1,024 B (0x400) when the disk control mode is the RAID0 mode, 512 B (0x200) in the RAID1 mode, and 512 B (0x200) in the single mode.

Referring again to FIG. 1, the RAID controller 15 obtains the descriptor 300a from the DRAM 13 by the DMA transfer function based on the head address information of the descriptor 300a transmitted from the RAID driver 32 in accordance with the disk access start instruction from the RAID driver 32. The RAID controller 15 stores the descriptor 300a into a not-shown register of itself. Subsequently, according to the obtained descriptor 300a, the RAID controller 15 controls the first HDD 19 or/and the second HDD 20.

The detailed flow of operations of the main components of the image forming apparatus 10 constructed as described above will be described as follows.

3. Writing Operation of Main Components on First Virtual Disk for RAID0 Mode The operation flow of writing data to the first virtual disk 1001 for the RAID0 mode will be described. By the operation, striping writing is realized.

Figure 9:
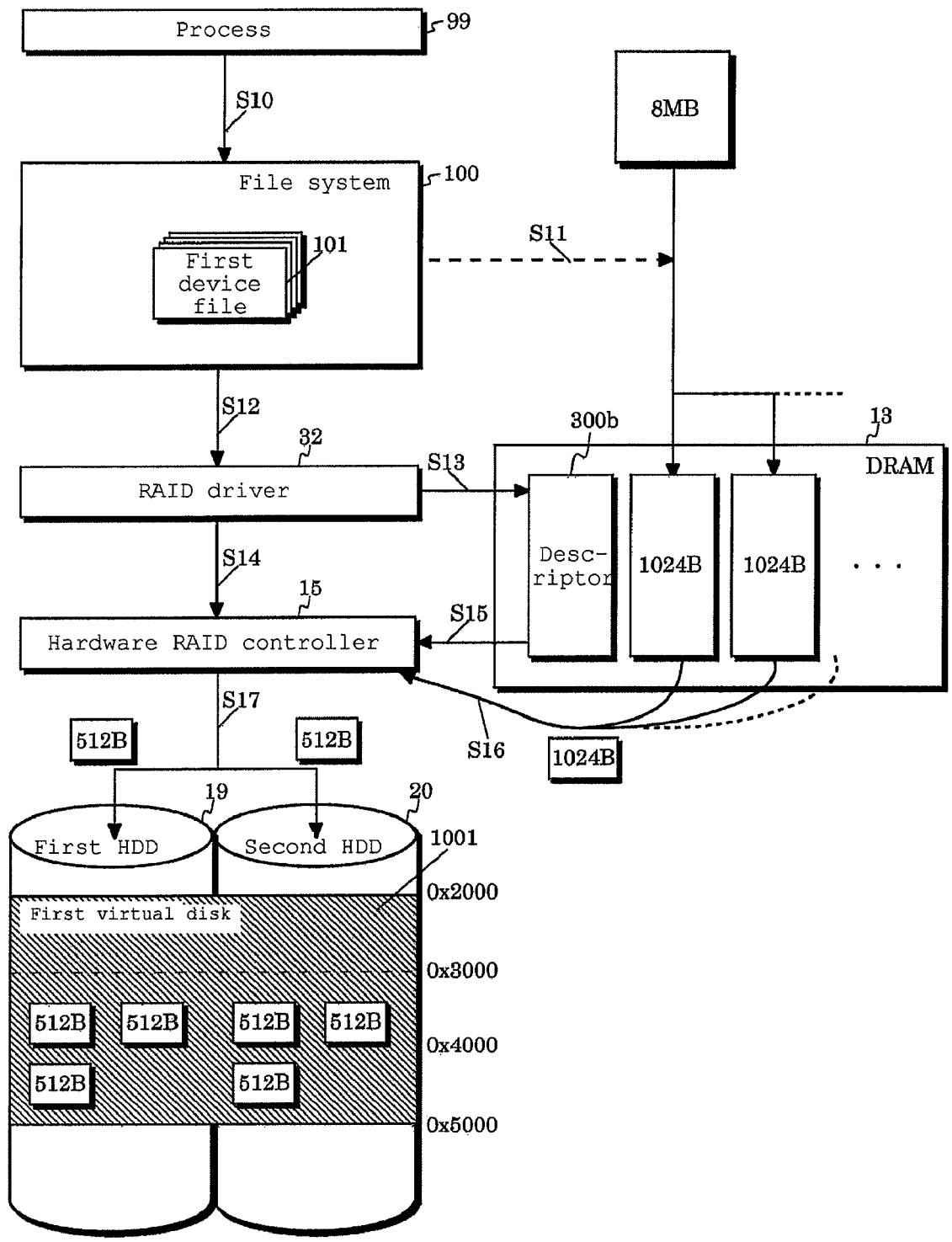
FIG. 9 shows a diagram showing a flow of operation of writing data of 8 MB to a first virtual disk for a RAID0 mode.

FIG. 9 is a diagram showing the operation flow of writing 8 MB of data to the first virtual disk 1001 for the RAID0 mode. In the following, the reference numerals in parenthesis indicate steps in FIG. 9.

(S10) The MPU 11 issues a data write command using the first device file 101 as an argument to the file system unit 100 in accordance with the process 99. That is, the MPU 11 calls a data write function of the file system unit 100 and issues a request to write the first virtual disk 1001.

(S11) In response to the write request, the file system unit 100 makes the MPU 11 transfer 8 MB of data, which is to be written on a 1024 B unit basis into a buffer area on the DRAM 13 each time the buffer area becomes empty on the block unit basis.

Figure 7B:
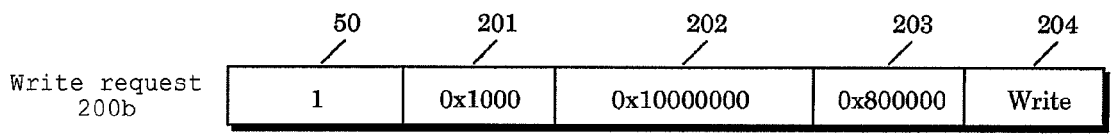

(S12) The file system unit 100 generates a write request 200b shown in FIG. 7B. The write request 200b includes but is not limited to the minor number information 50 "1" obtained by referring to the first device file 101 given as an argument, the start address information 201 of the virtual disk, the memory buffer address information 202 which is indicative of the head address of data to be written in the buffer area, the data size information 203 which indicative of the size of the data, and the command name information 204 which corresponds to the data write command. Subsequently, the file system unit 100 refers to the first device file 101, obtains the major number "300" registered in the file, and supplies the generated write request 200b to the RAID driver 32 corresponding to the major number.

Figure 8B:
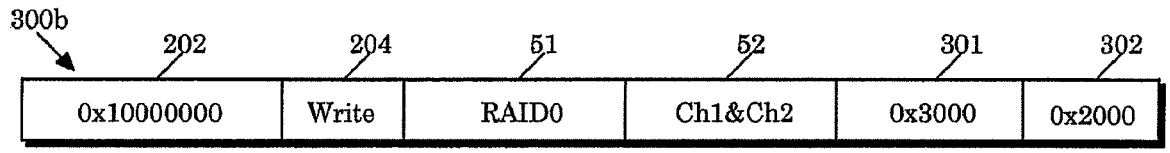

(S13) On receipt of the write request 200b, the RAID driver 32 generates a descriptor 300b as shown in FIG. 8B on the DRAM 13. The descriptor 300b is based on the write request 200b and the first virtual disk control block 41 stored on the DRAM 13, specified by the minor number "1" included in the write request 200b in accordance with the disk access function 35.

The RAID driver 32 determines information in the descriptor 300b in accordance with the disk access function 35 as described above. Particularly, the LBA address information 301 (0x3000) is determined by adding the LBA offset information 54 (0x2000) to the start address information 201 (0x1000). The information 302 of the number of sectors (0x2000) is determined by dividing the data size information 203 (0x800000=8 MB) by the size of data (0x400=1024 B) per sector.

(S14) The RAID driver 32 transmits the write start request and the head address information of the descriptor 300b on the DRAM 13 to the RAID controller 15 in accordance with the disk access function 35.

(S15) The RAID controller 15 obtains the descriptor 300b from the DRAM 13 by a DMA (Direct Memory Access) transfer based on the head address information received in response to the write start request.

(S16, S17) The RAID controller 15 writes write data simultaneously to the first HDD 19 and the second HDD 20 in the RAID0 mode based on the obtained descriptor 300b.

Concretely, the RAID controller 15 determines: 1) a write control from the command name information 204 in the obtained descriptor 300b; 2) the head address (0x10000000) of data to be written which is stored on the buffer area from the memory buffer address information 202; 3) a disk control in the RAID0 mode from the disk control mode information 51; 4) physical disks (first and second HDDs 19 and 20) to be subject to a disk control from the physical disk used information 52; 5) a head sector address (0x3000) from which writing starts in the storage area in a physical disk used from the LBA address information 301; and 6) the size (0x2000) of data to be written from the information 302 of the number of sectors. Based on those determinations, the RAID controller 15 obtains the data to be written, which is stored in the buffer area by 1,024 byte increments by DMA transfer. Then the data is divided into two portions and written into a free space in an area of the LBA addresses 0x3000 to 0x5000 in the first HDD 19 and a free space in an area of the LBA addresses 0x3000 to 0x5000 in the second HDD 20 on a 512 byte unit basis.

4. Reading Operation of Main Components from First Virtual Disk for RAID0 Mode The operation flow of reading data from the first virtual disk 1001 for the RAID0 mode will be described. By the operation, reading of data stored in the first virtual disk 1001 by striping is realized.

Figure 10:
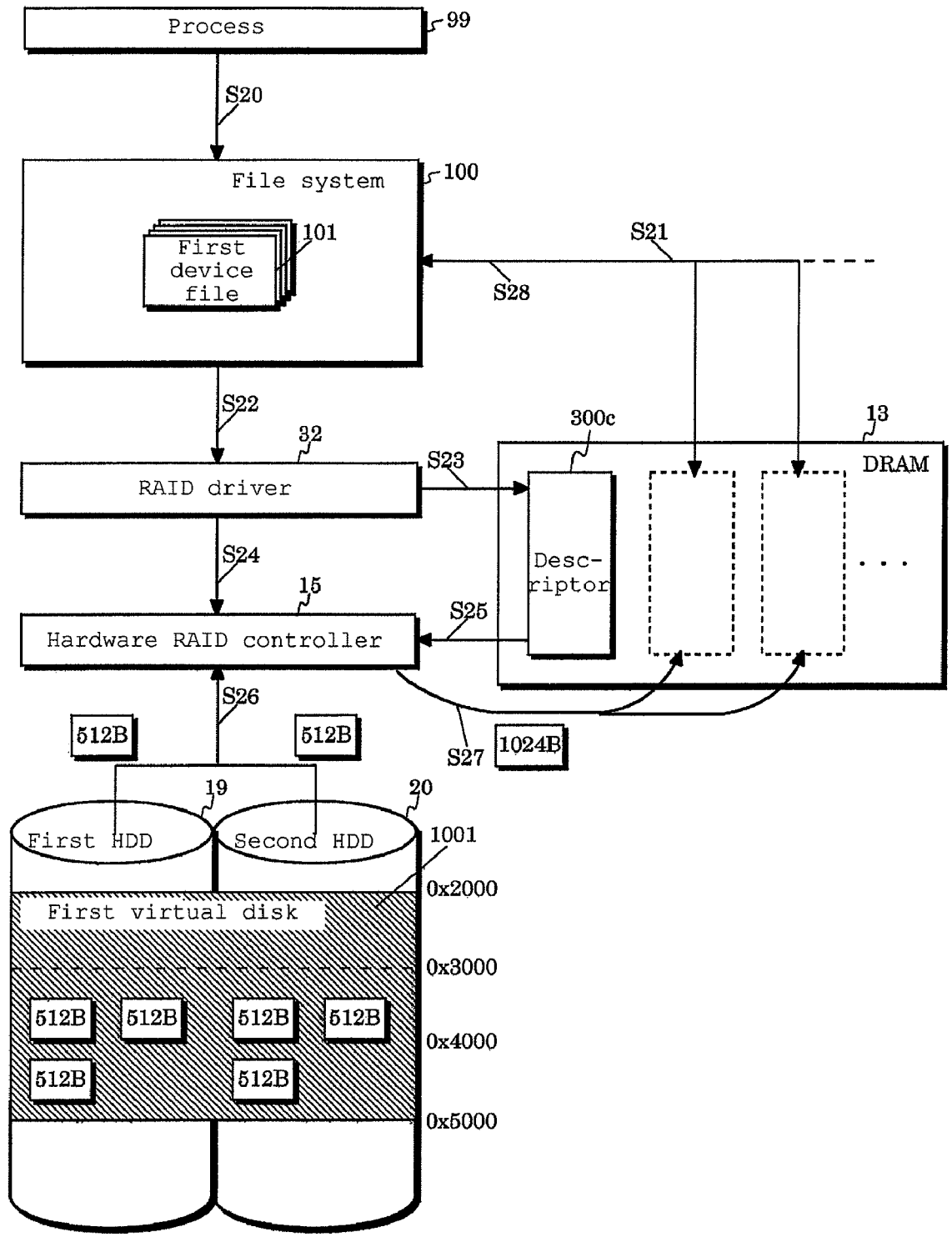
FIG. 10 shows a diagram showing a flow of operation of reading data of 8 MB from the first virtual disk for the RAID0 mode.

FIG. 10 is a diagram showing the flow of the operation of reading 8 MB of data from the first virtual disk 1001 for the RAID0 mode. In the following, reference numerals in parenthesis indicate steps in FIG. 10.

(S20) The MPU 11 issues a data read command using the first device file 101 as an argument to the file system unit 100 in accordance with the process 99. That is, the MPU 11 calls a data read function of the file system unit 100 and issues a request to read the first virtual disk 1001.

(S21) In response to the read request, the file system unit 100 directs the MPU 11 to assure the buffer area on the DRAM 13 in order to store data to be read.

Figure 7C:
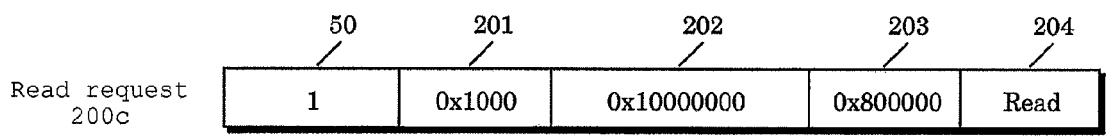

(S22) The file system unit 100 generates a read request 200c as shown in FIG. 7C which includes the minor number information 50 "1" obtained by referring to the first device file 101 given as an argument, the start address information 201 of the access to the virtual disk, the memory buffer address information 202 indicating the head address of the assured buffer area, the data size information 203 is indicative of the size of the data to be read, and the command name information 204 corresponds to the data read command. Subsequently, the file system unit 100 refers to the first device file 101 to obtain the major number "300" registered in the file and to supply the generated read request 200c to the RAID driver 32 corresponding to the major number.

Figure 8C:
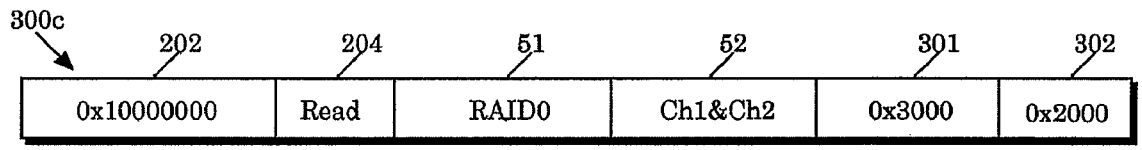

(S23) On receipt of the read request 200c, the RAID driver 32 generates a descriptor 300c as shown in FIG. 8C on the DRAM 13. The obtained descriptor 300c is based on the read request 200c and the first virtual disk control block 41 stored on the DRAM 13, which is specified by the minor number "1" included in the read request 200c in accordance with the disk access function 35.

The RAID driver 32 determines information in the descriptor 300c in accordance with the disk access function 35 as described above. Particularly, the LBA address information 301 (0x3000) is determined by adding the LBA offset information 54 (0x2000) to the start address information 201 (0x1000). The sector number information 302 (0x2000) in the descriptor 300c is determined by dividing the data size information 203 (0x800000=8 MB) by the data size (0x400=1024 B) per sector.

(S24) The RAID driver 32 transmits the read start request and the head address information of the descriptor 300c on the DRAM 13 to the RAID controller 15 in accordance with the disk access function 35.

(S25) The RAID controller 15 obtains the descriptor 300c from the DRAM 13 by DMA transfer based on the received head address information in response to the read start request.

(S26, S27, S28) Based on the obtained descriptor 300c, the RAID controller 15 stores the data to be read which is stored in the first virtual disk 1001 into the buffer area on the DRAM 13. The file system unit 100 reads the data stored in the buffer area.

Concretely, the RAID controller 15 determines: 1) a read control from the command name information 204 in the obtained descriptor 300c; 2) the head address (0x10000000) of the buffer area as a destination of storage from the memory buffer address information 202; 3) a disk control in the RAID0 mode from the disk control mode information 51; 4) physical disks (first and second HDDs 19 and 20) to be subject to a disk control from the information 52 of a physical disk used; 5) a head sector address (0x3000) from which reading starts in the storage area in a physical disk used from the LBA address information 301; and 6) size (0x2000) of data to be read from the information 302 of the number of sectors. Based on those determinations, the RAID controller 15 reads the data stored in the area of the LBA addresses 0x3000 to 0x5000 in the first HDD 19 and the area of the LBA addresses 0x3000 to 0x5000 in the second HDD 20 on a 512 byte unit basis. The RAID controller 15 combines the read data into data units of 1,024 B and stores the data into the buffer area designated by the memory buffer address information 202.

5. Writing Operation of Main Components on Second Virtual Disk for RAID1 Mode The flow of the operation of writing data to the second virtual disk 1002 for the RAID1 mode will be described. By the operation, writing by mirroring is realized.

Figure 11:
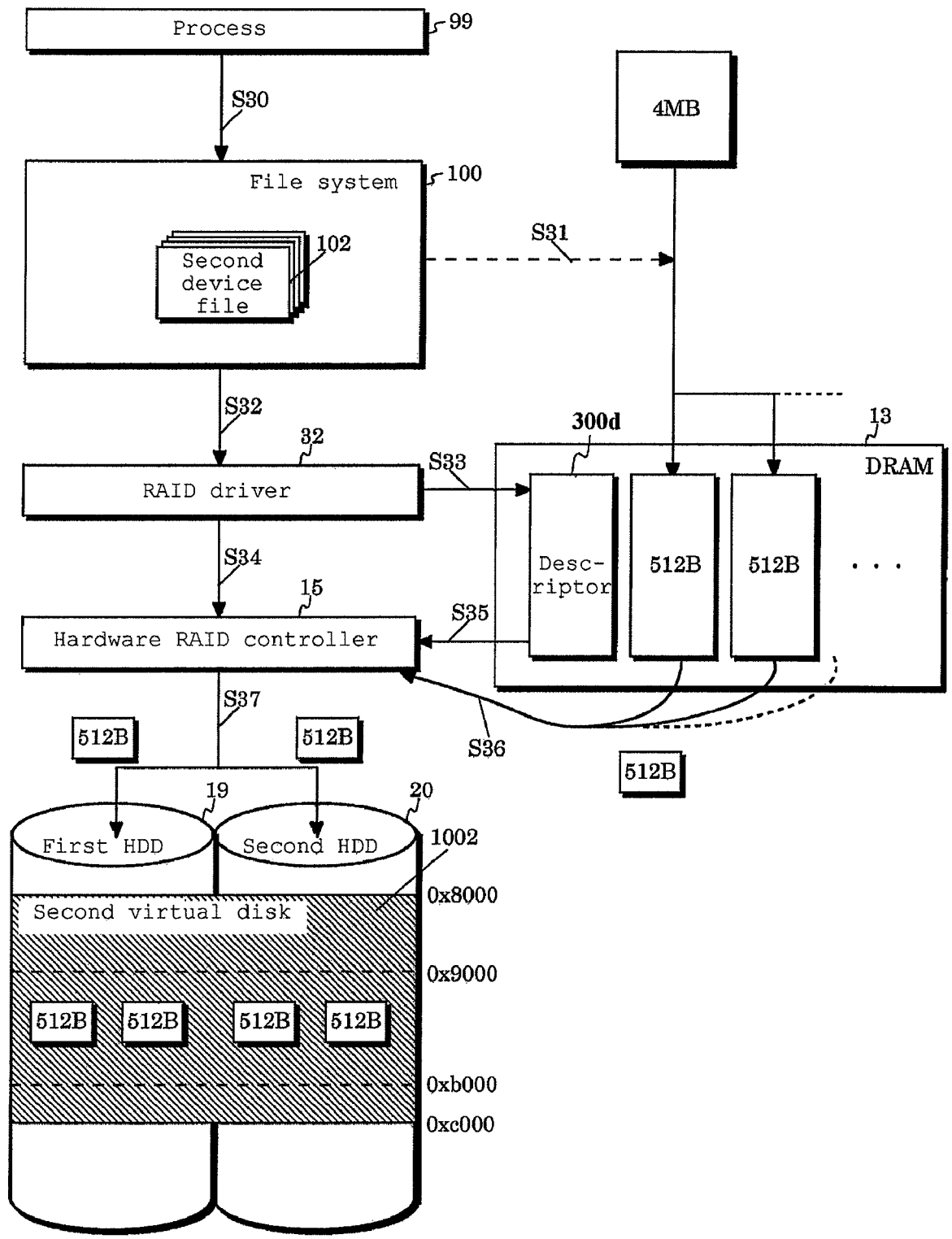
FIG. 11 shows a diagram showing a flow of operation of writing data of 4 MB to a second virtual disk for a RAID1 mode.

FIG. 11 is a diagram showing the flow of the operation of writing 4 MB of data to the second virtual disk 1002 for the RAID1 mode. In the following, reference numerals in parenthesis indicate steps in FIG. 11.

(S30) The MPU 11 issues a data write command using the second device file 102 as an argument to the file system unit 100 in accordance with the process 99. That is, the MPU 11 calls a data write function of the file system unit 100 and issues a request to write the second virtual disk 1002.

(S31) In response to the write request, the file system unit 100 makes the MPU 11 transfer 4 MB of data to be written on a 512 B unit basis into a buffer area on the DRAM 13 each time the buffer area becomes empty on a block unit basis.

Figure 7D:
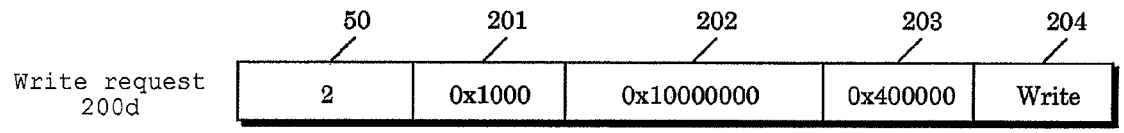

(S32) The file system unit 100 generates a write request 200d as shown in FIG. 7D which includes the minor number information 50 "2" obtained by referring to the second device file 102 given as an argument, the start address information 201 of the access to the virtual disk, the memory buffer address information 202 indicative of the head address of data to be written in the buffer area, the data size information 203 indicative of the size of the data, and the command name information 204 corresponding to the data write command. Subsequently, the file system unit 100 refers to the second device file 102, obtains the major number "300" registered in the file, and supplies the generated write request 200*d* to the RAID driver 32 corresponding to the major number.

Figure 8D:
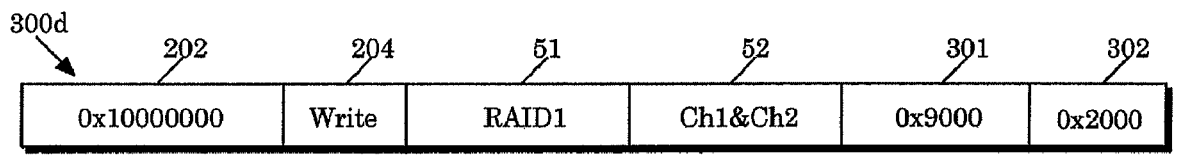

(S33) On receipt of the write request 200*d*, the RAID driver 32 generates a descriptor 300*d* as shown in FIG. 8D on the DRAM 13 based on the write request 200*d* and based on the second virtual disk control block 42 stored on the DRAM 13 which is specified by the minor number "2" included in the write request 200*d* in accordance with the disk access function 35.

The RAID driver 32 determines information in the descriptor 300*d* in accordance with the disk access function 35 as described above. Particularly, the LBA address information 301 (0x9000) is determined by adding the LBA offset information 54 (0x8000) to the start address information 201 (0x1000). The sector number information 302 (0x2000) in the descriptor 300*d* is determined by dividing the data size information 203 (0x400000=4 MB) by the data size (0x200=512 B) per sector.

(S34) The RAID driver 32 transmits the write start request and the head address information of the descriptor 300*d* on the DRAM 13 to the RAID controller 15 in accordance with the disk access function 35.

(S35) The RAID controller 15 obtains the descriptor 300*d* from the DRAM 13 by DMA transfer based on the received head address information in response to the write start request.

(S36, S37) The RAID controller 15 writes write data simultaneously to the first HDD 19 and the second HDD 20 in the RAID1 mode based on the obtained descriptor 300*d*.

Concretely, the RAID controller 15 determines: 1) a write control from the command name information 204 in the obtained descriptor 300*d*; 2) the head address (0x10000000) of data to be written which is stored on the buffer area from the memory buffer address information 202; 3) a disk control in the RAID1 mode from the disk control mode information 51; 4) physical disks (first and second HDDs 19 and 20) to be subject to a disk control from the information 52 of a physical disk used; 5) a head sector address (0x9000) from which writing starts in the storage area in a physical disk used from the LBA address information 301; and 6) size (0x2000) of data to be written from the information 302 of the number of sectors. Based on those determinations, the RAID controller 15 obtains the data to be written, which is stored in the buffer area in 512 byte increments by a DMA transfer. The RAID controller 15 writes the data into a free space in an area of the LBA addresses 0x9000 to 0xb000 in the first HDD 19 and a free space in an area of the LBA addresses 0x9000 to 0xb000 in the second HDD 20 on the 512 byte unit basis.

6. Reading Operation of Main Components from Second Virtual Disk for RAID1 Mode The operation flow of reading data from the second virtual disk 1002 for the RAID1 mode will be described. The reading operation is the same as that in the single mode. By this operation, reading of data stored in the first virtual disk 1001 by mirroring is realized.

Figure 12:
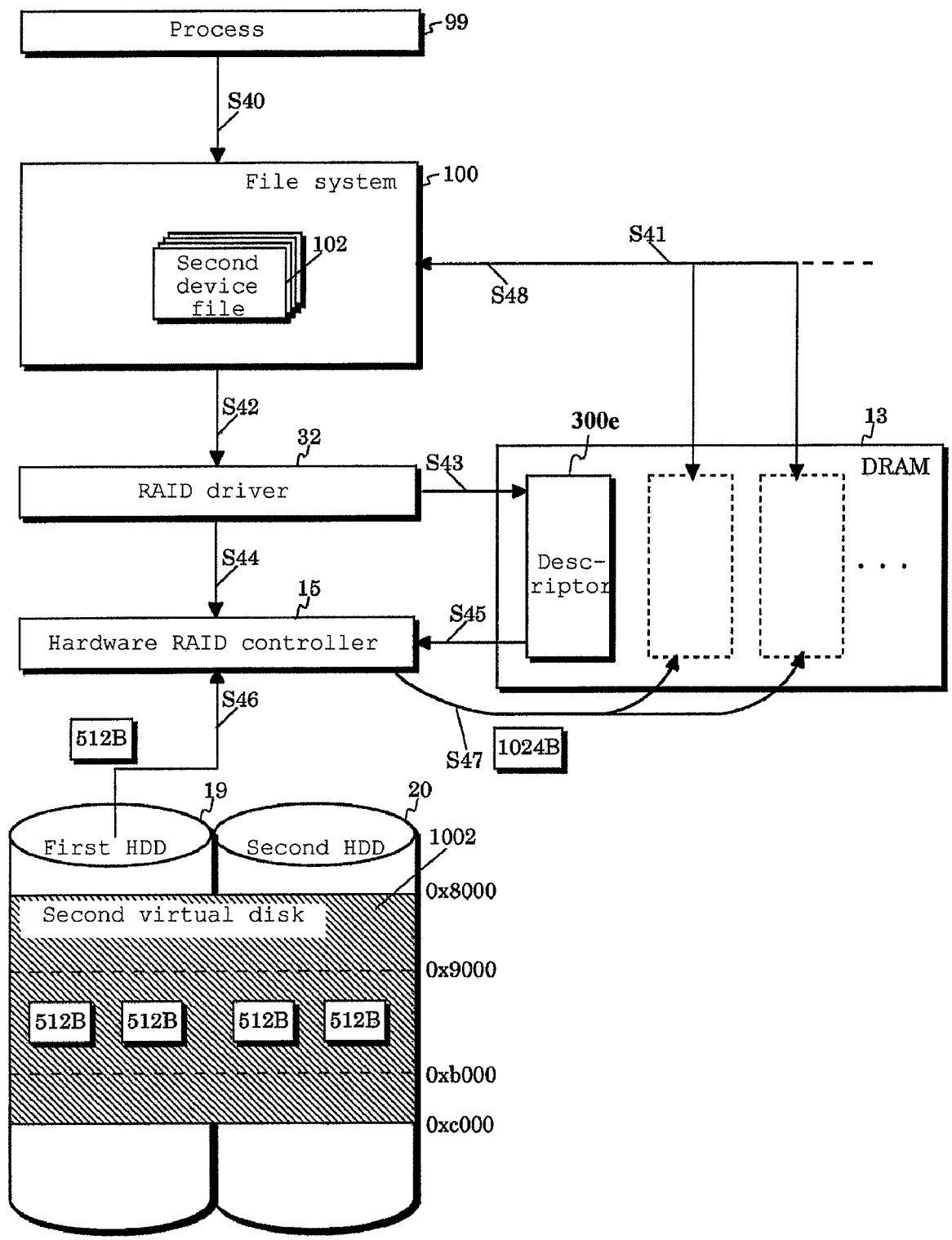
FIG. 12 shows a diagram showing a flow of operation of reading data of 4 MB from the second virtual disk for the RAID1 mode.

FIG. 12 is a diagram showing the flow of the operation of reading data of 4 MB from the second virtual disk 1002 for the RAID1 mode. In the following, reference numerals in parenthesis indicate steps in FIG. 12.

(S40) The MPU 11 issues a data read command using the second device file 102 as an argument to the file system unit 100 in accordance with the process 99. That is, the MPU 11 calls a data read function of the file system unit 100 and issues a request to read the second virtual disk 1002.

(S41) In response to the read request, the file system unit 100 directs the MPU 11 and assures the buffer area on the DRAM 13 in order to store data to be read.

Figure 7E:
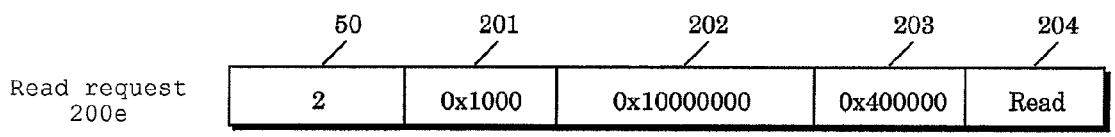

(S42) The file system unit 100 generates a read request 200*e* shown in FIG. 7E. The read request includes but is not limited to the minor number information 50 "2" obtained by referring to the second device file 102 given as an argument, the start address information 201 of the access to the virtual disk, the memory buffer address information 202 indicative of the head address of the assured buffer area, the data size information 203 indicative of the size of the data to be read, and the command name information 204 corresponding to the data read command. Subsequently, the file system unit 100 refers to the second device file 102, obtains the major number "300" registered in the file, and supplies the generated read request 200*e* to the RAID driver 32 corresponding to the major number.

Figure 8E:
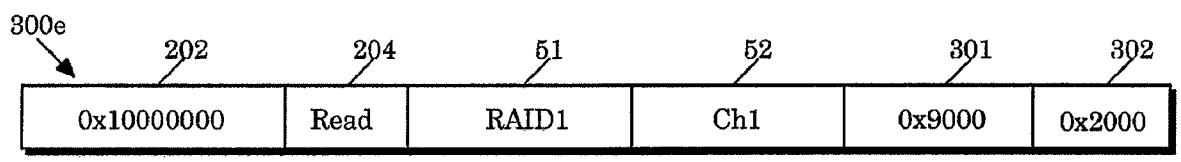

(S43) On receipt of the read request 200*e*, the RAID driver 32 generates a descriptor 300*e* as shown in FIG. 8E on the DRAM 13 based on the read request 200*e* and the second virtual disk control block 42 stored on the DRAM 13 which is specified by the minor number "2" included in the read request 200*e* in accordance with the disk access function 35. The physical disk used information 52 which is obtained from the second control block 42, indicates that the first HDD 19 and the second HDD 20 are used. However, in a case of mirroring, the same data is stored in the first and second HDDs 19 and 20 and it is unnecessary to read the data from both of the first and second HDDs 19 and 20. Therefore, in the present embodiment, the physical disk using information 52 in the descriptor 300*e* generated by the RAID driver 32 is changed so that the data is read only from the first HDD 19.

The RAID driver 32 determines information in the descriptor 300*e* in accordance with the disk access function 35 as described above. Particularly, the LBA address information 301 (0x9000) is determined by adding the LBA offset information 54 (0x8000) to the start address information 201 (0x1000). The information 302 of the number of sectors (0x2000) in the descriptor 300*e* is determined by dividing the data size information 203 (0x400000=4 MB) by the size of data (0x200=512 B) per sector.

(S44) The RAID driver 32 transmits the read start request and the head address information of the descriptor 300*e* on the DRAM 13 to the RAID controller 15 in accordance with the disk access function 35.

(S45) The RAID controller 15 obtains the descriptor 300*e* from the DRAM 13 by a DMA transfer based on the received head address information in response to the read start request.

(S46, S47, S48) Based on the obtained descriptor 300*e*, the RAID controller 15 stores the data to be read, which is stored in the second virtual disk 1002 into the buffer area on the DRAM 13. The file system unit 100 reads the data stored in the buffer area.

Concretely, the RAID controller 15 determines: 1) a read control from the command name information 204 in the obtained descriptor 300*e*; 2) the head address (0x10000000) of the buffer area as a destination of storage from the memory buffer address information 202; 3) a disk control in the RAID1 mode from the disk control mode information 51; 4) the physical disk (first HDD 19) to be subject to a disk control from the information 52 indicative of a physical disk used; 5) a head sector address (0x9000) from which reading starts in the storage area in a physical disk used from the LBA address information 301; and 6) size (0x2000) of data to be read from the information 302 of the number of sectors. Based on those determinations the RAID controller 15 reads the data stored in the area of the LBA addresses 0x9000 to 0xb000 in the first HDD 19 on the 512 byte unit basis, and stores it into the buffer area designated by the memory buffer address information 202.

7. Writing Operation of Main Components on Third Virtual Disk for Single Mode The operation flow of writing data to the third virtual disk 1003 for the single mode will be described. By this operation, normal writing which does not require high-speed processing and fault tolerance is realized.

Figure 13:
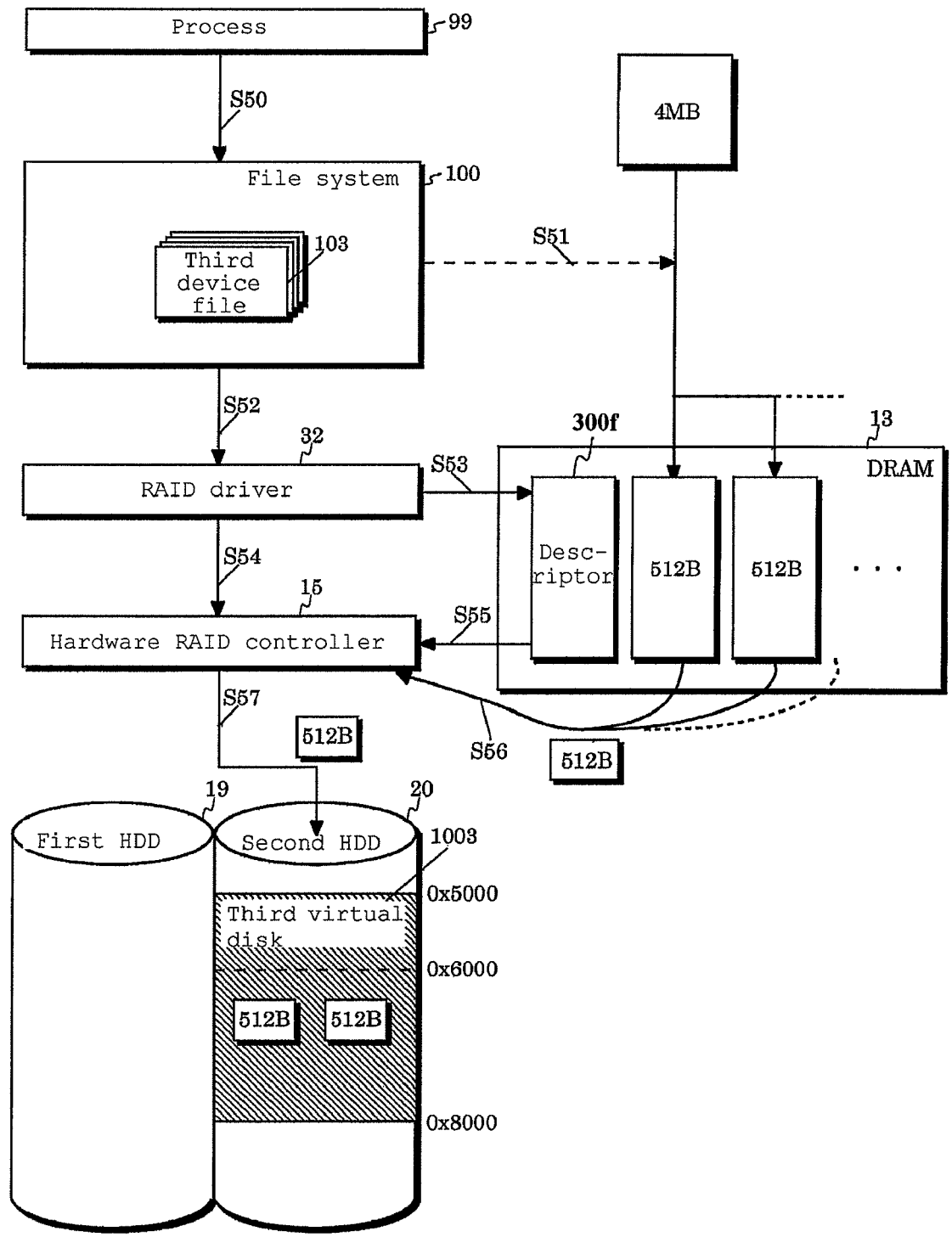
FIG. 13 shows a diagram showing a flow of operation of writing data of 4 MB to a third virtual disk for a single mode.

FIG. 13 is a diagram showing the flow of the operation of writing data of 4 MB to the third virtual disk 1003 for the single mode. In the following, reference numerals in parenthesis indicate steps in FIG. 13.

(S50) The MPU 11 issues a data write command using the third device file 103 as an argument to the file system unit 100 in accordance with the process 99. That is, the MPU 11 calls a data write function of the file system unit 100 and issues a request to write the third virtual disk 1003.

(S51) In response to the read request, the file system unit 100 makes the MPU 11 transfer 4 MB of data to be written on a 512 B unit basis into a buffer area on the DRAM 13 each time the buffer area becomes empty on the block unit basis.

Figure 7F:
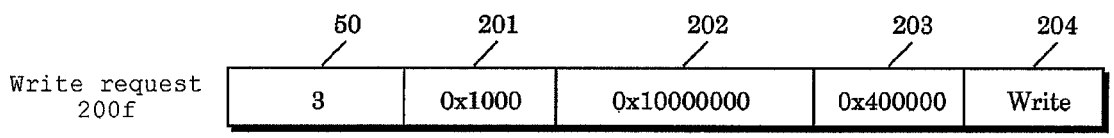

(S52) The file system unit 100 generates a write request 200f as shown in FIG. 7F. The write request includes but not limited to the minor number information 50 "3" obtained by referring to the third device file 103 given as an argument, the start address information 201 of the access to the third virtual disk 1003, the memory buffer address information 202 indicative of the head address of data to be written in the buffer area, the data size information 203 indicative of the size of the data, and the command name information 204 corresponding to the data write command. Subsequently, the file system unit 100 refers to the third device file 103 and obtains the major number "300" registered in the file, and supplies the generated write request 200f (FIG. 7F) to the RAID driver 32 corresponding to the major number.

Figure 8F:
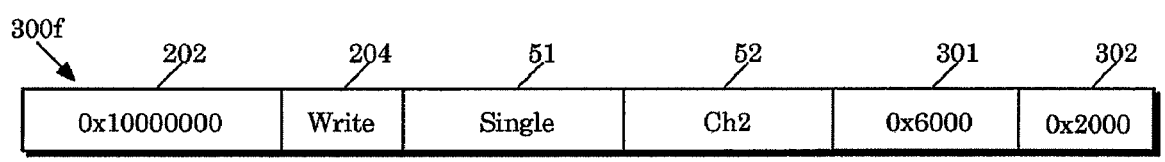

(S53) On receipt of the write request 200f (FIG. 7F), the RAID driver 32 generates a descriptor 300f as shown in FIG. 8F on the DRAM 13 based on the write request 200f and the third virtual disk control block 43 stored on the DRAM 13, specified by the minor number "3" which is included in the write request 200f in accordance with the disk access function 35.

The RAID driver 32 determines information in the descriptor 300f in accordance with the disk access function 35 as described above. Particularly, the LBA address information 301 (0x6000) is determined by adding the LBA offset information 54 (0x5000) to the start address information 201 (0x1000). The sector number information 302 (0x2000) in the descriptor 300f is determined by dividing the data size information 203 (0x400000=4 MB) by the size of data (0x200=512 B) per sector.

(S54) The RAID driver 32 transmits the write start request and the head address information of the descriptor 300f on the DRAM 13 to the RAID controller 15 in accordance with the disk access function 35.

(S55) The RAID controller 15 obtains the descriptor 300f from the DRAM 13 by DMA transfer based on the received head address information in response to the write start request.

(S56, S57) The RAID controller 15 writes write data to the second HDD 20 in the single mode based on the obtained descriptor 300f.

Concretely, the RAID controller 15 determines: 1) a write control from the command name information 204 in the obtained descriptor 300f; 2) the head address (0x1000000) of data to be written which is stored on the buffer area from the memory buffer address information 202; 3) a disk control in the single mode from the disk control mode information 51; 4) a physical disk (second HDD 20) to be subject to a disk control from the information 52 indicative of a physical disk used; 5) a head sector address (0x6000) from which writing starts in the storage area in a physical disk used from the LBA address information 301; and 6) the size (0x2000) of data to be written from the information 302 of the number of sectors. Based on those determinations, the RAID controller 15 obtains the data to be written which is stored in the buffer area in 512 byte increments by a DMA transfer, and writes the data into a free space in an area of the LBA addresses 0x6000 to 0x8000 in the second HDD 20 on a 512 byte unit basis.

8. Reading Operation of Main Components from Third Virtual Disk for Single Mode Since the reading operation of the main components from the third virtual disk 1003 for the single mode is similar as the operation for the second virtual disk 1002, the details will not be described here.

The writing operation of the main components to the fourth virtual disk 1004 for the single mode is the same as that to the third virtual disk 1003. Since the reading operation of the main components from the fourth virtual disk 1004 for the single mode is similar as the operation for the second virtual disk 1002, the details will not be described here.

9. Correspondence Relation between Virtual Disk and Area in HDD

Figure 14:
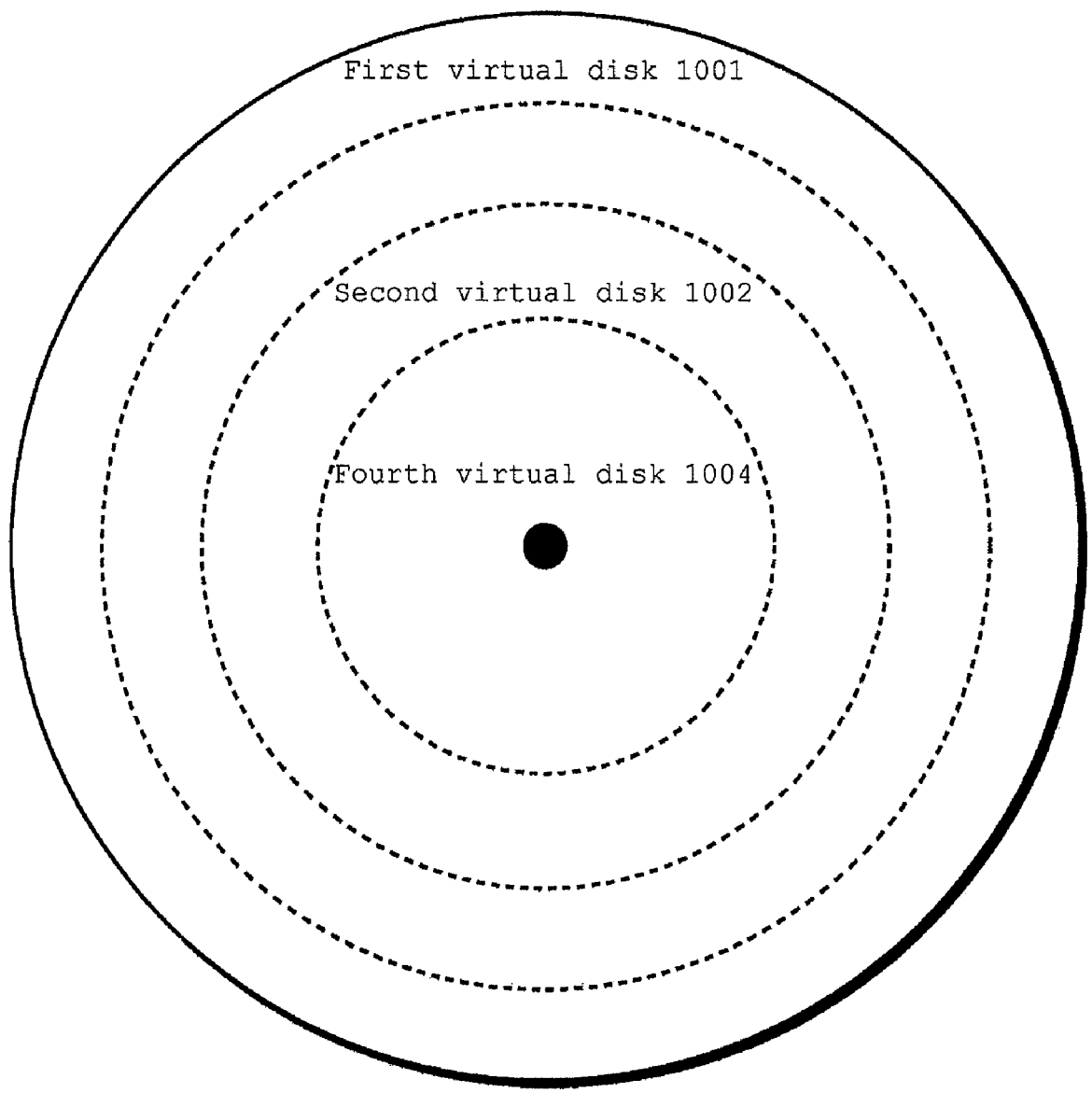
FIG. 14 shows a diagram schematically showing a state where an area of the first HDD is divided into virtual disks.

FIG. 14 is a schematic diagram showing a state where the area of the first HDD 19 is divided in virtual disks. FIG. 4 and other diagrams schematically show the state where each HDD is divided into virtual disks in the vertical direction. In reality, each of the first HDD 19 and the second HDD 20 has a disc shape. As shown in FIG. 14, the area is divided in the diameter direction of the disc.

It is known that the recording density increases from the inner periphery to the outer periphery of a general HDD including the first HDD 19 and the second HDD 20, so that the transfer speed at the outer periphery is higher than that at the inner periphery.

Therefore, in the embodiment according to the present invention, the area of the first virtual disk 1001 for the RAID0 mode which is required to have high transfer speed is thus assigned to the outer periphery side. The area of the second virtual disk 1002 for the RAID1 mode which is not required to have high transfer speed is then assigned to the inner periphery side. The assignment is performed based on the LBA offset information 54 and the total sector number 53 in each of the virtual disk control blocks 41 to 44. The LBA address is assigned in order from the outer periphery side toward the inner periphery side. Therefore, the smaller the LBA address is, the higher the transfer speed is. That is, the lower the numerical value of the LBA offset information 54 is, the higher the transfer speed of the virtual disk is.

With this configuration, the transfer speed of the first virtual disk 1001 for the RAID0 mode improves, and the effects of the RAID0 can be increased.

Figure 15:
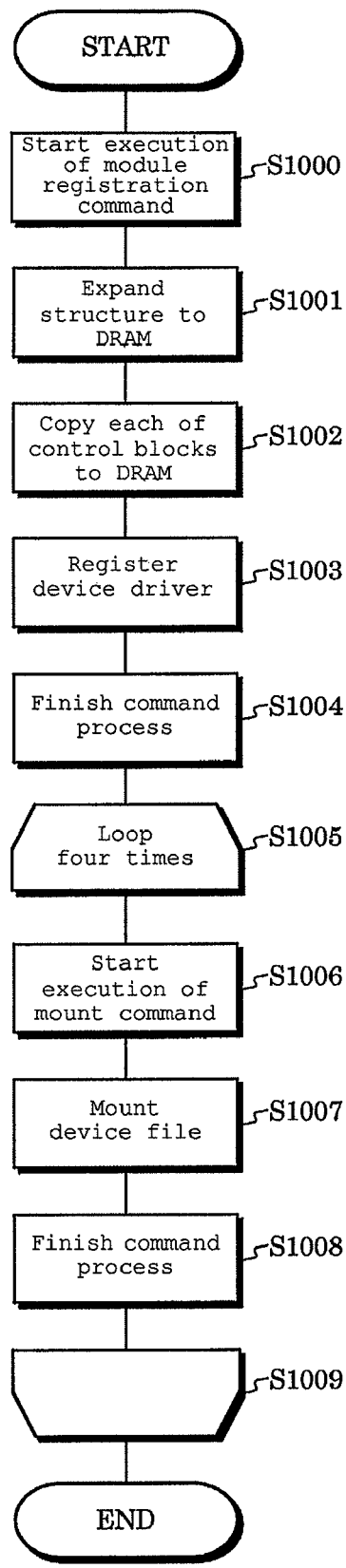
FIG. 15 shows a diagram showing a flowchart of a virtual disk registering process according to a further embodiment of the present invention.

10. Process of Registering Data To Virtual Disk According to the Present Invention FIG. 15 is a diagram showing a flowchart of a process of registering data to a virtual disk according to another embodiment of the present invention. In the following, the process for registering data to a virtual disk will be described with reference to the flowchart. The process is executed when a start script (for example, /etc/rc.d/rc.local) is read at the time of starting the kernel.

(S1000) The MPU 11 executes a module registration command (for example, insmod command) to register the RAID driver 32 of the present invention to the kernel.

(S1001) The MPU 11 calls the initialization function 36 in the RAID driver 32, as shown in FIG. 3, in accordance with the module registration command. Subsequently, the MPU 11 expands a plurality of data structures on the DRAM 13. This is done in order to store the virtual disk control blocks 41 to 44 which is information necessary to realize the virtual disks 1001 to 1004 in accordance with the initialization function 36. The structures are defined in a structure declaration part 5000 in the initialization function 36 as shown in FIG. 3.

(S1002) In accordance with the initialization function 36, the MPU 11 obtains the virtual disk control blocks 41 to 44 which are pre-stored in the first HDD 19. The MPU 11 stores the information 50 to 54 (see FIG. 5B) from the control blocks 41 to 44 into memory areas assured by elements of the corresponding structures. Since a device driver corresponding to the first HDD 19, that is, the RAID driver 32, has not been registered in the kernel yet, the MPU 11 obtains the control blocks 41 to 44 by directly designating the physical address in the first HDD 19.

(S1003) The MPU 11 registers the RAID driver 32 to the kernel in accordance with the initialization function 36.

(S1004) The MPU 11 finishes the process of the module registration command.

(S1005 to S1009) The MPU 11 executes a mount command a plurality of times, thereby mounting the first to fourth device files 101 to 104. The first through fourth device files 101 to 104 are preliminarily generated so as to be corresponding to the virtual disks into the file system unit 100.

In the steps, the first to fourth virtual disks 1001 to 1004 are recognized (registered) in the kernel. Although the scenario where the processes in the steps S1001 to S1003 are executed according to the initialization function 36 has been described, they may be executed by another function called from the initialization function 36.

From the above, in the present embodiment of the present invention, each of four virtual disks is provided with the control block which includes normal information such as the LBA offset information 54 necessary to realize the virtual disk and, in addition, the disk control mode information 51 for designating a disk control mode of the virtual disk to the RAID controller 15 and the information 52 indicative of a physical disk used, for designating an HDD used in the disk control mode. The RAID driver 32 generates a descriptor (for example, 300b) which includes the disk control mode information 51 and the physical disk used for information 52 which is based on the disk access request (for example, 200b) and the control block (for example, the first virtual disk control block 41) corresponding to the virtual disks 1001 to 1004 to be accessed. The RAID driver 32 transmits the descriptor to the disk array control unit. Therefore, the information processor of the present embodiment according to the present invention produces an effect such that storage areas corresponding to at least three distributable disk control modes including RAID can coexist in the two HDDs 19 and 20.

The image forming apparatus 10 includes but not limited to the NIC 16 connected to a network and has the above-described configuration. Since the device driver 32 receives a disk access request via the NIC 16, there is an effect such that the invention can promptly address the demand in recent years to improve high-speed processing and fault tolerance in the image forming apparatus connected to a network.

Furthermore, the value indicated by the LBA offset information 54 in the first disk control block 41 corresponding to the RAID0 mode is set to be smaller than that of the offset information 54 in the second virtual disk control block 42 corresponding to the RAID1 mode. Consequently, the first virtual disk 1001 is positioned more on the outer peripheral side of both of the disc-shaped disks of the first HDD 19 and the second HDD 20 than the second virtual disk 1002. From the viewpoint that the access speed increases toward the outer peripheral side in a disc-shaped of a general auxiliary storage device, an effect can be produced to improve the RAID0 and emphasizing access speed.

11. Modifications

The foregoing embodiments of the present invention are examples for explaining the invention, and the scope of the present invention is not limited to the embodiments. A person skilled in the art can carry out the present invention in various other modes without departing from the gist of the present invention. A part of the modes will be described below.

In the present embodiments, the case where the image forming apparatus 10 has the main components of the present invention has been described. Another information processor, such as a network server or a personal computer, may have the main components.

To explain the present invention, the present embodiments have been described on precondition of using Linux®. The invention can also be applied to other operating systems (OSs) such as Windows®.

The case of generating four virtual disks corresponding to the disk control modes using two HDDs has been described. It is also possible to generate a number of virtual disks corresponding to various disk control modes such as RAID2 to RAID6 to the limits of the capacity of the first HDD 19 and the second HDD 20, the limits of the OS 30 (for example, the limit of the mount number), and the limits of the function of the disk control mode of the RAID controller 15 and to allow storage areas corresponding to a plurality of types of RAID modes to co-exist. For example, storage areas corresponding to the RAID0 to RAID6 and the single mode can co-exist by using two HDDs.

The storage destination of the first to fourth control blocks 41 to 44 before starting the image forming apparatus 10, is not limited to the first HDD 19 but may be, for example, the EEPROM 14 in which the OS 30 and the application 31 are stored, the second HDD 20, and the like.

On the other hand, software such as the OS 30, application 31, and RAID driver 32 may be stored in the first HDD 19 or the second HDD 20.

The RAID driver 32 is not limited to the case of making the MPU 11 transmit a descriptor indirectly to the RAID controller 15 by using the DMA transfer method (the MPU 11 transmits the head address of the descriptor but does not transmit the descriptor itself). For example, the RAID driver 32 may make the MPU 11 transmit the descriptor itself directly.

The present invention will be summarized based on the foregoing exemplary preferred embodiments as follows. An information processor according to an embodiment of the present invention comprises a main storing unit and an auxiliary storing unit that has two auxiliary storage devices in which at least three distributable virtual disks are formed so as to be distributed. The present invention further comprises a disk array control unit that connects to the auxiliary storing unit and that controls the at least three distributable virtual disks with one of a designated disk control modes such as a RAID0 mode, a RAID1 mode, and a single mode. Furthermore, an embodiment of the present invention further comprises a CB (control block) storing unit that stores a CB in each virtual disk that includes first designation information for designating the disk control mode and second designation information for designating an auxiliary storage used in the designated disk control mode which is stored in each of the virtual disks. The present invention also comprises a device driver unit that generates, on the main string unit, control information of the disk array control unit including but not limited to the first designation information and the second designation information and that directly or indirectly transmits the control information to the disk array control unit based on a request for accessing any of the at least three distributable virtual disks and a control block corresponding to the requested virtual disk.

The disk array control unit may control a predetermined storage area in the two auxiliary storages. Alternatively, the disk array control unit may control one of the two auxiliary storages with a predetermined disk control mode based on the first designation information and the second designation information in the control information transmitted by the device driver unit.

The control information may include buffer address information on the main storing unit indicative of a temporary storage destination of data to be accessed. The device driver unit transmits the buffer address information and an instruction to start the disk access to the disk array control unit so that the disk array control unit obtains the control information and thereby "indirectly" transmitting the control information.

The disk array control unit may obtain the control information by a DMA transfer.

An information processor according to another embodiment of the present invention includes, in addition to the above-described configuration, a file system unit. The file system unit directs an operating system to recognize the at least three distributable virtual disks storing different first designation information, in response to a first disk access request for any of the at least three distributable virtual disks. The file system unit also newly generates a second disk access request including first disk identification information for identifying a virtual disk to be accessed and corresponding to the device driver unit and transmits the second disk access request to the device driver unit.

In this case, the control block may include second disk identification information for identifying one of the at least three distributable virtual disks. The device driver unit may obtain the second disk identification information from the control block and collate the first disk identification information included in the second disk access request sent from the file system unit with the second disk identification information. The device driver unit thereby specifies a control block corresponding to a virtual disk to be accessed.

The control block may include total sector number information indicating the total number of sectors of the one virtual disk and offset information indicating the head address on an auxiliary storage of the one virtual disk. The control information may include command name information according to the disk access request, head address information on the auxiliary storage from which the disk access starts, and transmissive sector number information indicating the number of sectors transferred to the auxiliary storage.

The disk control modes of the disk array control unit may also include a RAID mode different from a RAID0 mode and a RAID1 mode. The CB storing unit stores a first control block in which the first designation information indicates the RAID0 mode, a second control block in which the first designation information indicates the RAID1 mode, and a third control block in which the first designation information indicates the different disk control mode. The at least three distributable virtual disks may include a first virtual disk corresponding to the first control block, a second virtual disk corresponding to the second control block, and a third virtual disk corresponding to the third control block.

The CB storing unit may store a first control block in which the first designation information indicates the RAID0 mode, and a second control block in which the first designation information indicates the RAID1 mode. Offset information in the first control block and offset information in the second control block may be set so that a virtual disk corresponding to the first control block is positioned more on an outer periphery side of the two auxiliary storages than a virtual disk corresponding to the second control block.

An information processor according to another embodiment of the present invention can include, in addition to the above-described configuration, a CB obtaining unit that stores all of the control blocks stored in the CB storing unit onto the main storing unit.

In this case, the CB storing unit may be one of the two auxiliary storage devices. The device driver unit may obtain a control block corresponding to the requested virtual disk from the main storing unit and generate the control information.

An information processor according to yet another embodiment of the present invention may include but is not limited to, in addition to the above-described configuration, a communication unit connected to a network.

In this case, the device driver unit may obtain the disk access request via the communication unit.

The present invention can be carried out not only with the information processor but also as by using a virtual disk managing method. A virtual disk managing method according to another embodiment of the present invention includes the steps of: 1) forming at least three distributable virtual disks so as to be distributed in two auxiliary storages; 2) controlling the at least three distributable virtual disks with one of the designated disk control modes including a RAID0 mode, a RAID1 mode, and a single mode; 3) storing a control block (CB) in each virtual disk that includes first designation information for designating the disk control mode and second designation information for designating an auxiliary storage used in the designated disk control mode; 4) generating, on a main string unit, control information including the first designation information and the second designation information based on a request for accessing any of the at least three distributable virtual disks and a control block corresponding to the requested virtual disk; and 5) transmitting the control information to a disk array control unit directly or indirectly.

The present invention can also be carried out as a computer-readable recording medium in which a device driver is recorded. Specifically, in a computer-readable recording medium according to yet another embodiment of the present invention, where a device driver of an information processor is recorded. The information processor includes but is not limited to: a main storing unit, an auxiliary storing unit, a disk array control unit, and a CB storing unit. The auxiliary storing unit has two auxiliary storages in which at least three distributable virtual disks are formed so as to be distributed. The disk array control unit connects to the two auxiliary storages and which in turn controls the at least three distributable virtual disks with designated one of disk control modes including a RAID0 mode, a RAID1 mode, and a single mode. The CB storing unit stores a control block (CB) in each virtual disk that includes first designation information for designating the disk control mode and second designation information for designating an auxiliary storage used in the designated disk control mode is stored in each of the virtual disks. The device driver causes the computer to execute: a process of generating, on the main string unit, control information including the first designation information and the second designation information based on a request for accessing any of the at least three distributable virtual disks and a control block corresponding to the requested virtual disk, and a process of directly or indirectly transmitting the control information to the disk array control unit.

The device driver is supplied from the computer-readable recording medium such as a ROM, a hard disk, a flexible disk, a memory card, or a magnetooptic disc.

Having thus described in detail preferred embodiments of the present invention, it is to be understood that the invention defined by the foregoing paragraphs is not to be limited to any particular details and/or embodiments set forth in the above description, as many apparent variations thereof are possible without departing from the spirit or scope of the present invention.

What is claimed is:

1. An information processor comprising:
   a main storing unit;
   an auxiliary storing unit that has at least one auxiliary storage in which at least three distributable virtual disks are formed;
   a disk array control unit that connects to the auxiliary storing unit and controls the at least three distributable virtual disks having one of a designated disk control modes;
   a CB storing unit that stores a control block (CB) in each virtual disk, the CB includes first designation information for designating the disk control mode and second designation information for designating an auxiliary storage used in the designated disk control mode; and
   a device driver unit that,
      generates, on the main storing unit, control information of the disk array control unit, the control information including the first designation information and the second designation information, and
      directly or indirectly transmits the control information to the disk array control unit based on a request for accessing any of the at least three distributable virtual disks and based a control block corresponding to the requested virtual disk.

2. The information processor according to claim 1, wherein the disk array control unit controls the at least three distributable virtual disks with one of a RAID0 mode, a RAID1 mode, or a single mode.

3. The information processor according to claim 2, wherein the disk control modes of the disk array control unit also include a RAID mode different from a RAID0 mode and a RAID1 mode,
   the CB storing unit stores a first control block in which the first designation information indicates the RAID0 mode, a second control block in which the first designation information indicates the RAID1 mode, and a third control block in which the first designation information indicates the different disk control mode, and
   the at least three distributable virtual disks include a first virtual disk corresponding to the first control block, a second virtual disk corresponding to the second control block, and a third virtual disk corresponding to the third control block.

4. The information processor according to claim 2, wherein the CB storing unit stores a first control block in which the first designation information indicates the RAID0 mode, and a second control block in which the first designation information indicates the RAID1 mode, and
   offset information in the first control block and offset information in the second control block are set so that a virtual disk corresponding to the first control block is positioned on an outer periphery side of disc-shaped discs of the two auxiliary storages than a virtual disk corresponding to the second control block.

5. The information processor according to claim 1, wherein the disk array control unit controls a predetermined storage area in at least one of the two auxiliary storage devices with a predetermined disk control mode based on the first designation information and the second designation information contained in the control information transmitted by the device driver unit.

6. The information processor according to claim 1, wherein the control information includes buffer address information on the main storing unit indicative of a temporary storage destination of data to be accessed, and
   the device driver unit transmits the buffer address information and an instruction to start the disk access to the disk array control unit so that the disk array control unit obtains the control information, and thereby indirectly transmitting the control information.

7. The information processor according to claim 1, wherein the disk array control unit obtains the control information by a Direct Memory Access (DMA) transfer.

8. The information processor according to claim 1, further comprising a file system unit that
   directs an operating system to recognize the at least three distributable virtual disks storing different first designation information, in response to a first disk access request for any of the at least three distributable virtual disks,
   newly generates a second disk access request including first disk identification information for identifying a virtual disk to be accessed and corresponding to the device driver unit, and
   transmits the second disk access request to the device driver unit.

9. The information processor according to claim 8, wherein the control block includes second disk-identification information for identifying one of the at least three distributable virtual disks, and
   the device driver unit obtains the second disk identification information from the control block and collates the first disk identification information included in the second disk access request sent from the file system unit with the second disk identification information, thereby specifying a control block corresponding to a virtual disk to be accessed.

10. The information processor according to claim 1, wherein the control block includes total sector number information indicative of total number of sectors of one virtual disk and offset information indicative of a head address on an auxiliary storage of one virtual disk, and
    the control information includes command name information according to the disk access request, head address information on the auxiliary storage from which the disk access starts, and transmissive sector number information indicative of the number of sectors transferred to the auxiliary storage.

11. The information processor according to claim 1, further comprising a CB obtaining unit that stores all of the control blocks stored in the CB storing unit onto the main storing unit, and wherein
the CB storing unit is one of the two auxiliary storages, and the device driver unit obtains a control block corresponding to the requested virtual disk from the main storing unit and generates the control information.

12. The information processor according to claim 1, further comprising a communication unit connected to a network, wherein the device driver unit obtains the disk access request via the communication unit.

13. A virtual disk managing method of forming a virtual disk in an information processor and managing the virtual disk, comprising the steps of:
forming at least three distributable virtual disks so as to be distributed in two auxiliary storages;
controlling the at least three distributable virtual disks with designated one of disk control modes including a RAID0 mode, a RAID1 mode, and a single mode;
storing a control block (CB) in each virtual disk that includes first designation information for designating the disk control mode and second designation information for designating an auxiliary storage used in the designated disk control mode;
generating, on a main string unit, control information including the first designation information and the second designation information based on a request for accessing any of the at least three distributable virtual disks and a control block corresponding to the requested virtual disk; and
transmitting the control information to a disk array control unit directly or indirectly.

14. The computer-readable recording medium of claim 13, wherein the process of generating the control information is based on a request for accessing any of the at least three distributable virtual disks and a control block corresponding to the requested virtual disk.

15. A computer-readable recording medium in which a device driver of an information processor is recorded, the information processor comprising:
a main storing unit;
an auxiliary storing unit that has two auxiliary storages in which at least three distributable virtual disks are formed so as to be distributed;
a disk array control unit that connects to the two auxiliary storages and that controls the at least three distributable virtual disks with designated one of disk control modes including a RAID0 mode, a RAID1 mode, and a single mode; and
a CB storing unit that stores a control block (CB) in each virtual disk that includes first designation information for designating the disk control mode and second designation information for designating an auxiliary storage used in the designated disk control mode, and
the device driver for causing the computer to execute:
a process of generating, on the main storage unit, control information including the first designation information and the second designation information; and
a process of directly or indirectly transmitting the control information to the disk array control limit.

16. An information processor comprising:
a main storing unit;
an auxiliary storing unit that has at least one auxiliary storage device that forms a plurality of distributable virtual disks;
a disk array control unit that connects to the auxiliary storing unit and controls the plurality of virtual disks operating by one of a designated disk control modes;
a CB storing unit that stores a control block (CB) in each virtual disk, including at least for designating the disk control mode and for designating an auxiliary storage used in the designated disk control mode; and
a device driver unit that generating control information of disk array control unit and transmitting control information based on
generating, on the main storing unit, control information of the disk array control unit, and
transmitting the control information to the disk array control unit based on a request for accessing any of the virtual disks and based on the control block.

* * * * *